(12) United States Patent
Guo et al.

(10) Patent No.: US 9,398,617 B2
(45) Date of Patent: Jul. 19, 2016

(54) METHODS AND APPARATUS FOR RANDOM ACCESS IN A COMMUNICATION SYSTEM

(71) Applicant: Huawei Technologies Co., Ltd., Shenzhen (CN)

(72) Inventors: Changyu Guo, Shanghai (CN); Li Wan, Shanghai (CN); Chunhui Le, Chengdu (CN); Jing Li, Shanghai (CN); Yan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 14/326,273

(22) Filed: Jul. 8, 2014

(65) Prior Publication Data

US 2014/0321398 A1     Oct. 30, 2014

Related U.S. Application Data

(63) Continuation of application No. PCT/CN2013/070174, filed on Jan. 7, 2013.

(30) Foreign Application Priority Data

Jan. 9, 2012    (CN) .......................... 2012 1 0004747

(51) Int. Cl.
     *H04W 74/00*         (2009.01)
     *H04W 74/08*         (2009.01)
              (Continued)

(52) U.S. Cl.
     CPC ....... *H04W 74/0833* (2013.01); *H04J 13/0062* (2013.01); *H04L 27/2675* (2013.01); *H04J 2211/005* (2013.01); *H04L 5/0007* (2013.01)

(58) Field of Classification Search
     CPC ............ H04J 13/0062; H04J 2211/005; H04L 27/2675; H04L 12/413; H04L 47/70; H04W 74/0833; H04W 74/04; H04W 72/12; H04W 74/0808; H04W 74/08; G05B 2219/31187; G05B 2219/31188; G05B 2219/25226
     USPC .............. 370/276–277, 281, 293, 295, 310.2, 370/326, 328–330, 431, 445, 447, 458–459, 370/461–462; 375/146–147, 260, 285, 375/295–296, 316; 455/447, 450, 451, 455/452.1, 464

See application file for complete search history.

(56) References Cited

U.S. PATENT DOCUMENTS

| | | | | |
|---|---|---|---|---|
| 2008/0168114 A1* | 7/2008 | Han | .................... | H04J 13/0062 708/209 |
| 2008/0267303 A1* | 10/2008 | Baldemair | ........... | H04B 1/7075 375/260 |

(Continued)

FOREIGN PATENT DOCUMENTS

| | | |
|---|---|---|
| CN | 101641925 A | 2/2010 |
| CN | 101689882 | 3/2010 |

(Continued)

OTHER PUBLICATIONS

3GPP, "3rd Generation Partnership Project; Technical Specification Group Radio Access Network; Requirements for Evolved UTRA (E-UTRA) and Evolved UTRAN (E-UTRAN)," 3GPP TR 25.913, Version 9.0.0, Release 9, Dec. 2009, 18 pages.

(Continued)

*Primary Examiner* — Mohamed Kamara
(74) *Attorney, Agent, or Firm* — Slater Matsil, LLP

(57) ABSTRACT

Embodiments of the present invention relate to a method and an apparatus for processing random access in a wireless communication network, and a processing method of a user equipment and an apparatus. The method for processing random access in the communication network includes: the base station receives a first Zadoff-Chu sequence and a second Zadoff-Chu sequence that are sent by a user equipment, a $d_u$ of the first Zadoff-Chu sequence is smaller than a $d_u$ of the second Zadoff-Chu sequence; the base station estimates an error range for a round trip delay RTD of the user equipment according to the first Zadoff-Chu sequence, estimates, according to the second Zadoff-Chu sequence, the RTD within the error range for the RTD or a frequency offset of an uplink signal of the user equipment. The problem that the user equipment with a frequency offset accesses a network is solved.

20 Claims, 15 Drawing Sheets

(51) Int. Cl.
*H04J 13/00* (2011.01)
*H04L 27/26* (2006.01)
*H04L 5/00* (2006.01)

(56) References Cited

U.S. PATENT DOCUMENTS

2009/0073944 A1  3/2009  Jiang et al.
2009/0247172 A1* 10/2009  Palanki ............... H04J 11/0069
                                                          455/447

FOREIGN PATENT DOCUMENTS

| CN | 102255722 | 11/2011 |
|---|---|---|
| CN | 102263767 | 11/2011 |
| EP | 1944935 A2 | 7/2008 |
| EP | 2456155 A1 | 5/2012 |
| RU | 2434246 C1 | 11/2011 |
| WO | 2009149760 A1 | 12/2009 |
| WO | 2010040264 | 4/2010 |

OTHER PUBLICATIONS

3GPP, "3rd Generation Partnership Project; Technical Specification Group Radio Access Network; Evolved Universal Terrestrial Radio Access (E-UTRA); Physical Channels and Modulation," 3GPP TS 36.211, Version 10.4.0, Release 10, Dec. 2011, 101 pages.

* cited by examiner

METHODS AND APPARATUS FOR RANDOM ACCESS IN A COMMUNICATION SYSTEM

This application is a continuation of International Application No. PCT/CN2013/070174, filed on Jan. 7, 2013, which claims priority to Chinese Patent Application No. 201210004747.5, filed on Jan. 9, 2012, both of which are hereby incorporated by reference in their entireties.

TECHNICAL FIELD

The embodiments of the present invention relate to the field of communications, and in particular, to a method and an apparatus for random access.

BACKGROUND

In a Long Term Evolution (hereinafter referred to as LTE) system, a Random Access Channel (hereinafter referred to as RACH) is mainly used for initial access of a User Equipment (UE), and it carries no user data. A signal sent by the UE on the RACH channel is a Preamble Sequence (hereinafter referred to as Preamble), and the preamble sequence is a Zadoff-Chu sequence (hereinafter referred to as ZC sequence). As shown in FIG. 1, the 3GPP TS 36.211 Specification stipulates that, the Preamble includes two parts: a Cyclic Prefix (hereinafter referred to as CP) with a length of $T_{CP}$, and an access sequence (hereinafter referred to as sequence or SEQ) with a length of $T_{SEQ}$.

Meanwhile, the Specification stipulates several parameter settings in different formats to match different cell radiuses, as shown in Table 1:

TABLE 1

| Preamble Sequence Format Number | $T_{CP}$ | $T_{SEQ}$ | Maximum Cell Radius (km) |
|---|---|---|---|
| 0 | $3168 \cdot T_s$ | $24576 \cdot T_s$ | About 14.6 |
| 1 | $21024 \cdot T_s$ | $24576 \cdot T_s$ | About 77.3 |
| 2 | $6240 \cdot T_s$ | $2 \cdot 24576 \cdot T_s$ | About 29.6 |
| 3 | $21024 \cdot T_s$ | $2 \cdot 24576 \cdot T_s$ | About 100 |
| 4 | $448 \cdot T_s$ | $4096 \cdot T_s$ | About 1.4 |

Note:
$T_s$ is a basic time unit in the LTE Specification and $T_s = 1/(15000 \times 2048)$s.

The LTE system is optimized in a low-speed case from 0 to 15 km/h, still has relatively high performance at a higher moving speed (e.g., 15-120 km/h), and the LTE system could also maintain connection at 120 km/h to 350 km/h. Depending on different features of system carrier frequency, the highest speed of the UE allowed by a current standard can be up to 500 km/h (TS25.913-900).

However, with the development of communication technologies and the development of users' requirements for communication, carriers need to provide services to higher speed vehicles. For example, requirements are brought forward for LTE communication covering a flight mode. A moving speed of the UE is higher in a flight case, which could be up to 1200 km/h, and therefore, a Doppler frequency shift is greater if the carrier frequency is same. On the other hand, to reduce network deployment costs, a larger cell radius needs to be supported, as the cell radius can even exceed 200 km, and a large cell causes a Round Trip Delay (hereinafter referred to as RTD or round trip delay) to become larger. These conditions all bring forward challenges to a random access technology.

SUMMARY

An aspect of the present invention provides a method for processing random access in a communication system, the method comprising receiving, by a base station, a first Zadoff-Chu sequence and a second Zadoff-Chu sequence which are sent by a user equipment, wherein a $d_u$ of the first Zadoff-Chu sequence is smaller than a $d_u$ of the second Zadoff-Chu sequence. An error range is estimated by the base station for a round trip delay RTD of the user equipment according to the first Zadoff-Chu sequence. At least one of the RTD of the user equipment and a frequency offset of an uplink signal from the user equipment are estimated in accordance with the range for the RTD and the second Zadoff-Chu sequence.

In this way, when cell coverage is relatively large, the base station could estimate the RTD of a UE with a certain moving speed or estimate the frequency offset of the uplink signal of the UE with a certain moving speed.

Another aspect of the present invention provides an apparatus for processing random access in a wireless communication system, the apparatus comprising a receiver configured to receive in a random access channel (RACH) from a user equipment (UE) a radio frequency signal which comprises a first Zadoff-Chu sequence and a second Zadoff-Chu sequence, wherein a $d_u$ of the first Zadoff-Chu sequence is smaller than a $d_u$ of the second Zadoff-Chu sequence. A processor is configured to perform frequency domain to time domain baseband processing on the radio frequency signal and also configured to estimate a range for a RTD of the UE in accordance with the first Zadoff-Chu sequence. The processor is also configured to, in accordance with the range for the RTD and the second Zadoff-Chu sequence, at least one of the RTD of the UE and a frequency offset of an uplink signal from the UE to the wireless communication network is estimate.

Such a base station could perform covering of a large cell, and also could estimate the RTD of a UE with a certain moving speed or estimate the frequency offset of the uplink signal of the UE with a certain moving speed.

Another aspect of the present invention provides a random access method of a user equipment (UE), comprising obtaining, by the UE, a first Zadoff-Chu sequence and a second Zadoff-Chu sequence, wherein a $d_u$ of the first Zadoff-Chu sequence is smaller than a $d_u$ of the second Zadoff-Chu sequence. Sending, by the user equipment, in a random access channel (RACH) to a base station, the first Zadoff-Chu sequence and a second Zadoff-Chu sequence, wherein the first Zadoff-Chu sequence is used for the base station to estimate a range for a round trip delay (RTD) of the UE, and the second Zadoff-Chu sequence is used for the base station to estimate the RTD within the range for the RTD or estimate a frequency offset of an uplink signal of the UE.

In this way, the user equipment, in a case of movement, could make it convenient for the base station to estimate its RTD or the frequency offset of its uplink signal by transmitting two ZC sequences.

Another aspect of the present invention provides a user equipment comprising a memory configured to store a first Zadoff-Chu sequence and a second Zadoff-Chu sequence, wherein a $d_u$ of the first Zadoff-Chu sequence is smaller than a $d_u$ of the second Zadoff-Chu sequence. The first Zadoff-Chu sequence is used to estimate a range for a RTD, and the second Zadoff-Chu sequence is used to identify the RTD within the range for the RTD or identify a frequency offset of an uplink signal of the user equipment. A processor is configured to perform time domain to frequency domain baseband signal processing on the first Zadoff-Chu sequence and the second Zadoff-Chu sequence.

Such a user equipment, in a case of movement, can make it convenient for a base station to estimate its RTD or the frequency offset of its uplink signal by transmitting two ZC sequences.

A computer program product, a system method, and a system apparatus of this present invention are also provided accordingly. They solve problems that the user equipment with a frequency offset accesses a network.

BRIEF DESCRIPTION OF THE DRAWINGS

To illustrate the technical solutions of the embodiments of the present invention more clearly, the accompanying drawings for describing the embodiments are introduced briefly in the following. Apparently, the accompanying drawings in the following description are only some embodiments of the present invention; persons of ordinary skill in the art may further derive other similar solutions according to these accompanying drawings without creative efforts.

DETAILED DESCRIPTION OF ILLUSTRATIVE EMBODIMENTS

The technical solutions in the embodiments of the present invention are clearly and completely described in the following with reference to the accompanying drawings in the embodiments of the present invention. Apparently, the embodiments to be described are a part of the embodiments of the present invention rather than all of the embodiments. All other embodiments obtained by persons of ordinary skill in the art based on the embodiments of the present invention without creative efforts should be within the protection scope of the present invention.

Figure 2:
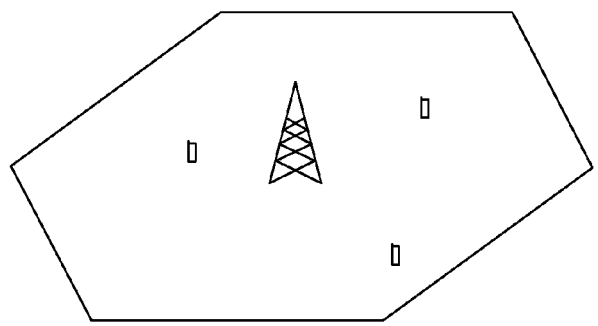
FIG. 2 is a diagram illustrating a mobile communication cell according to an embodiment.

As shown in FIG. 2, an embodiment provides a mobile communication system. The system includes at least one base station (only one is shown in the figure) and at least one UE that is located in a cell covered by the base station. The UE may be a mobile terminal, or a mobile telephone (or referred to as "cellular" telephone), or a computer with a mobile terminal. For example, it may be a portable, pocket-sized, handheld, computer's built-in or vehicle-mounted mobile apparatus.

The base station may be an evolved Node B (eNB or e-NodeB, evolved Node B) in a LTE and a TD-LTE (Time Division LTE), or a base station in other communication systems which are based on an OFDM modulation technology, and a base station in various communication systems which are based on a random access channel of a Zadoff-Chu sequence.

The following is an analysis of the RACH channel being configured with multiple access sequences. The base station provides multiple random access sequences for the UE to select and use, and there may be a conflict if two UEs use the same random sequence at the same time. When the UE needs random access, one of the random access sequences is selected and sent. When a receiver of the base station parses the random access sequence out, a response message is sent to the UE which uses the random access sequence. When multiple UEs use the same random access sequence, the conflict that occurred leads to a result that some UEs cannot access successfully. In a definition of the 3GPP TS 36.211 Specification, a total of 838 ZC root sequences are provided, and at most 64 access sequences can be configured in each communication cell.

One or more random access sequences can be obtained from a single Zadoff-Chu sequence (the single Zadoff-Chu sequence may be referred to as a root sequence) through a cyclic shift. Because the ZC sequence is an ideal autocorrelation sequence and is non-zero only when a delay is 0, cross-correction of other delays is constant amplitude which is irrelevant to a time delay.

According to the definition of the random access sequence in the 3GPP TS 36.211 Specification, a $u^{th}$ ZC sequence is represented as:

$$x_u(n) = e^{-j\frac{\pi un(n+1)}{N_{ZC}}}, \quad \text{(Formula 1)}$$
$$0 \le n \le N_{ZC} - 1$$

where u is referred to as a physical root sequence number, and n is an integer from 0 to $N_{ZC}-1$.

NZC is the total number of sampling points of a generated ZC sequence, and as an implementation manner, NZC=839. It is not difficult to understand that NZC also can be other values. However, for ease of description of the embodiments of the present invention, NZC of the ZC sequences in the following is all described by taking 839 as an example.

When a frequency offset of $\Delta f$ (whose unit is Hz) exists, a sequence with the frequency offset can be represented as:

$$x_u(n, \Delta f) = e^{-j\frac{\pi un(n+1)}{N_{ZC}}} e^{j\frac{2\pi n}{N_{ZC}}\Delta f \cdot T_{SEQ}}, \quad \text{(Formula 2)}$$
$$0 \le n \le N_{ZC} - 1$$

where $T_{SEQ}$ is a time length occupied by the foregoing ZC sequence. As an implementation manner, the 3GPP TS 36.211 Specification defines that $T_{SEQ}$=800 μs. Likewise, according to requirements of the communication system, $T_{SEQ}$ may also be other time lengths. $\Delta f$ may be further represented as:

$$\Delta f = \frac{1}{T_{SEQ}}, \quad \text{(Formula 3)}$$
$$x_u(n, \Delta f) = x_u(x - d_u)e^{j\Phi_u}$$

where the meaning of $d_u$ is as follows:

$$d_u = \begin{cases} p & 0 \le p < N_{ZC}/2 \\ N_{ZC} - p & \text{in other cases} \end{cases} \quad \text{(Formula 4)}$$

where p is a minimum nonnegative integer of $(p \cdot u) \mod N_{zc} = 1$.

Therefore, $d_u$ indicates a shift of an image peak output by a receiver relative to a round trip delay when the frequency offset is $1/T_{SEQ}$. After NZC is a fixed value, it can be known according to Formula 3 and Formula 4 that $d_u$ is determined by the value of u, and meanwhile p is also determined by the value of u. Therefore, the $d_u$ of each sequence with the physical root sequence number being u can be regarded as the characteristic of the sequence itself. The $d_u$ of the ZC sequence is the number of sequence offset sampling points, and can only be a positive value. The p is an integer of 1, 2, 3 . . . or 838.

FIGS. 3a, 3b, 3c, 3d, 3e, 3f, and 3g are Power Delay Profile outputs by correlation processing a received UE random sequence by a receiver of a base station. The Power Delay Profile is also referred to herein as PDP. The random access sequence used here is a Zadoff-Chu sequence (ZC sequence) whose physical root sequence number is 330 and is defined by 3GPP TS 36.211. The p of this sequence is 689, and the $d_u$ is 150.

Figure 3A:
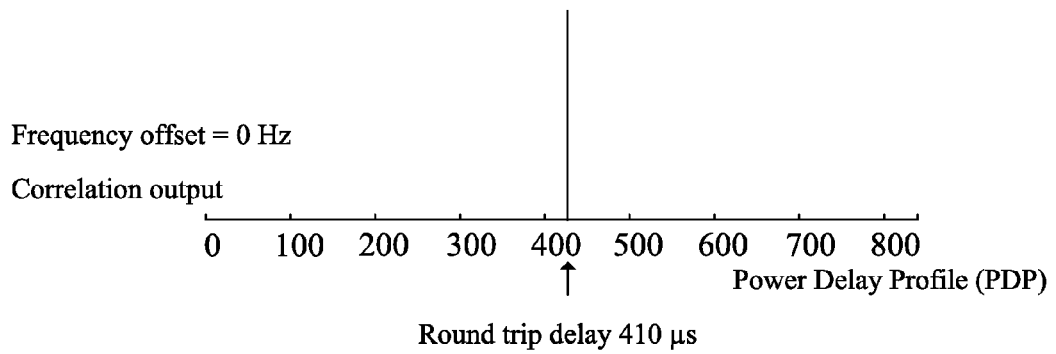
FIG. 3a is a diagram illustrating, output by a receiver, power delay profile of an access sequence whose frequency offset equals to 0 Hz.

What is shown in FIG. 3a is a diagram of correlation output of an uplink access sequence, processed by the base station receiver, whose round trip delay (RTD) is 410 μs and frequency offset is 0 Hz. The horizontal axis in the figure is Power Delay Profile sampling points, and 839 sampling points correspond to the ZC sequence of NZC=839. The sampling points here and a sampling rate of the base station are not the same concept. A time range corresponding to an entire horizontal axis is 800 μs, and a time interval is between successive sampling points, where the time interval is 800/839 μs≈0.95 μs. At this time, there is only one peak outputted by the receiver and with a correct round trip delay.

Figure 3B:
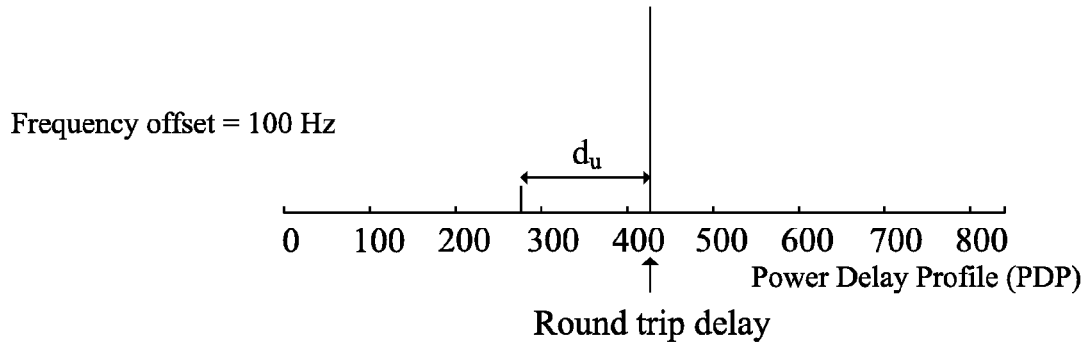
FIG. 3b is a diagram illustrating, output by a receiver, power delay profile of an access sequence whose frequency offset equals to 100 Hz.

What is shown in FIG. 3b is a diagram of correlation output of the uplink access sequence, processed by the base station receiver, whose RTD is 410 μs and frequency offset is 100 Hz. By reason of the frequency offset, the diagram of correlation output also includes a number of small-energy peaks, their energies are not significant as compared with background noise, and are usually filtered out through a discrimination threshold. In this application, the correlation output peaks to be described in the following all indicate significant peaks left after discrimination of the threshold. At this time, in addition to a peak at a round trip delay, there is also a small image peak at $d_u$=150 before the peak. Due to the characteristic of the Zadoff-Chu sequence, in a case of positive frequency offset, an image peak moves p sampling points to the right. In this way, a sampling point whose PDP horizontal axis reading is 838 shifts one time interval to the right to move to a sampling point of 0, and therefore such shift is also referred to as a cyclic shift. The image peak cyclically shifts p=689 PDP sampling points to the right, which is also equivalent to shifting 839−p=150 sampling points to the left from the round trip delay.

It can be known through deriving from the foregoing formulas that the $d_u$ is determined by the characteristic of the selected sequence. An example is given to describe the influence of the frequency offset on the position of the image peak: if the frequency offset of an uplink access sequence changes to 200 Hz or 400 Hz, except the peak at the round trip delay position, the positions of the other image peaks on the time axis maintain at same positions as shown in FIG. 3b and may not vary according to the frequency offset.

Figure 3C:
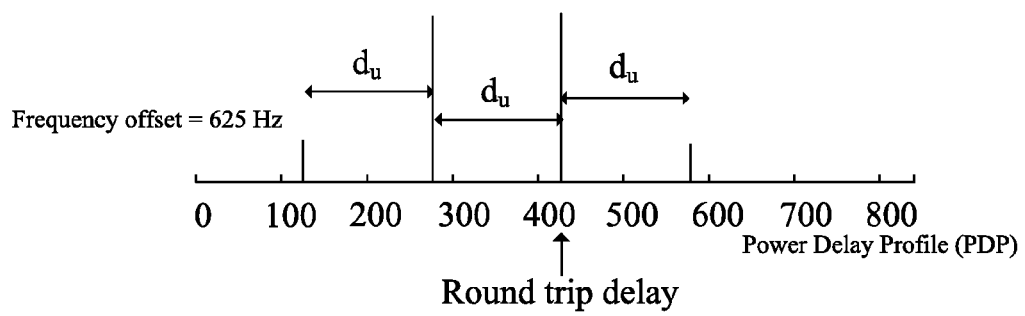
FIG. 3c is a diagram illustrating, output by a receiver, power delay profile of an access sequence whose frequency offset equals to 625 Hz.

What is shown in FIG. 3c is a diagram of correlation output of the uplink access sequence, processed by the base station receiver, whose RTD is 410 μs and frequency offset is 625 Hz. At this time, in addition to the peak at the round trip delay position, an image peak with equivalent amplitude exists before it with a distance of $d_u$. Because the bandwidth of a RACH subcarrier is 1250 Hz, 625 Hz is just half of the bandwidth of the RACH subcarrier, and this is the reason why two peaks with a similar magnitude appear. In addition, the correlation receiver further outputs two smaller image peaks which are distributed on two sides of these two peaks, and distances between each of them and each of the two peaks are $d_u$.

Figure 3D:
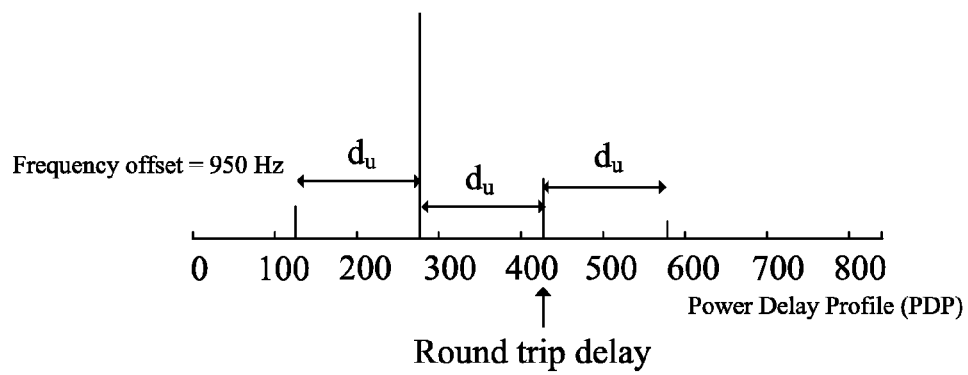
FIG. 3d is a diagram illustrating, output by a receiver, power delay profile of an access sequence whose frequency offset equals to 950 Hz.

What is shown in FIG. 3d is a diagram of correlation output of the uplink access sequence, processed by the base station receiver, whose RTD is 410 μs and frequency offset is 950 Hz. Because the frequency offset 950 Hz at this time is closer to the subcarrier bandwidth 1250 Hz ($\Delta f_{RACH}$) of the RACH channel, the position of the image peak with a great magnitude is ahead of the round trip delay with a distance of $d_u$, and the smaller-energy peak appear at the round trip delay position.

Figure 3E:
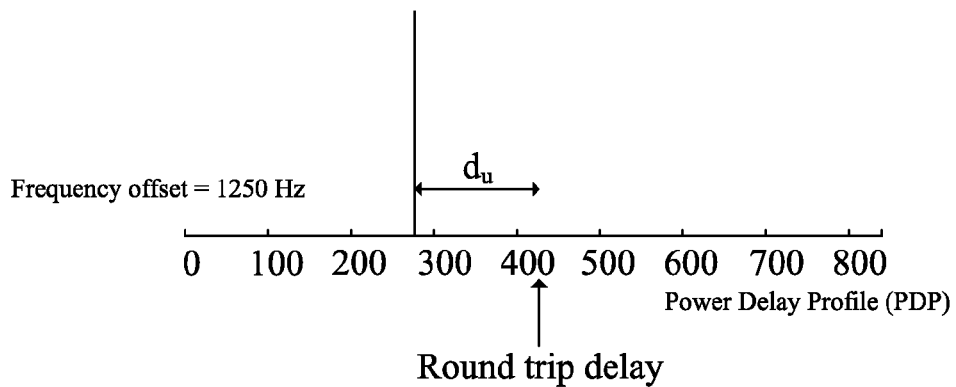
FIG. 3e is a diagram illustrating, output by a receiver, power delay profile of an access sequence whose frequency offset equals to 1250 Hz.

What is shown in FIG. 3e is a diagram of correlation output of the uplink access sequence, processed by the base station receiver, whose RTD is 410 μs and frequency offset is 1250 Hz. At this time, the image peak completely moves a distance of $d_u$ from the round trip delay. If the timing where the peak locates is directly read from the time axis, it would be 410−$d_u$×(800/839)≈267 μs. It looks like a correlation output peak of an access preamble with RTD=267 μs and 0 frequency offset.

In actual situations, the frequency offset is caused by relative movement between the UE and an antenna of the base station or a difference of frequency sources between the UE and the base station, and here multiple frequency offset values are listed to illustrate the influence on correlation output, which is not intended to limit the types of the frequency offsets in the actual scenarios.

Figure 3F:
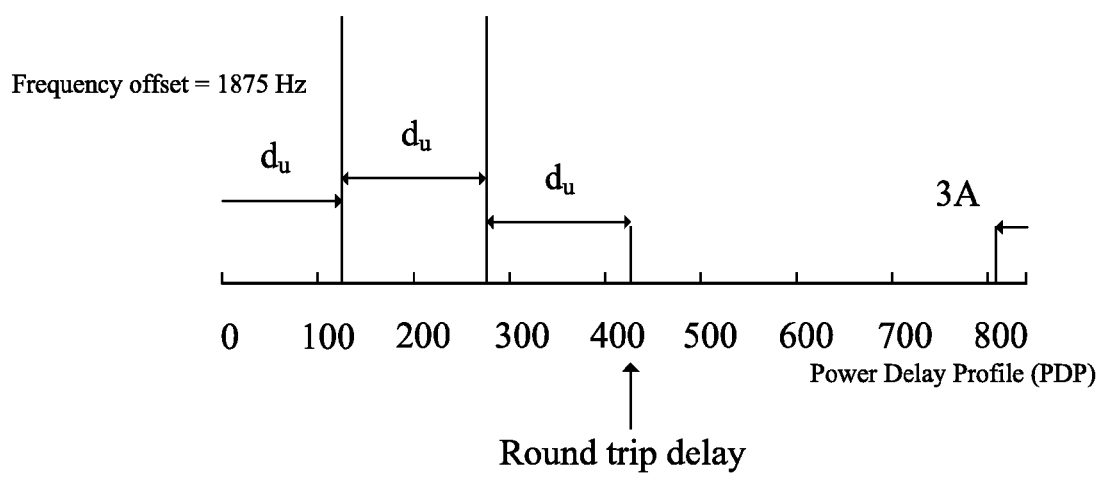
FIG. 3f is a diagram illustrating, output by a receiver, power delay profile of an access sequence whose frequency offset equals to 1875 Hz.

What is shown in FIG. 3f is a diagram of correlation output of the uplink access sequence, processed by the base station receiver, whose RTD is 410 μs and frequency offset is 1875 Hz. At this time, 4 peaks appear. Because the frequency offset falls at the middle of one-fold of subcarrier bandwidth 1250 Hz and a double of subcarrier bandwidth 2×1250 Hz, two peaks with larger energy and approximately equal magnitude fall in positions which shift a one-fold of $d_u$ and a double of $d_u$ from the round trip delay. The other two small peaks fall in positions which are a one-fold of $d_u$ before and after the two larger peaks. Due to the cyclic shift, the small peak that shifts forward appears at the position of 3 A at the right side of the time axis. In this example, only a small peak appears at the actual RTD position.

Figure 3G:
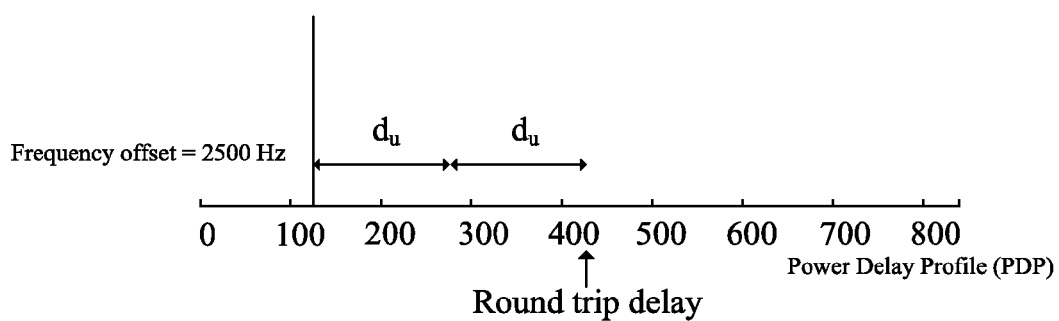
FIG. 3g is a diagram illustrating, output by a receiver, power delay profile of an access sequence whose frequency offset equals to 2500 Hz.

What is shown in FIG. 3g is a diagram of correlation output of the uplink access sequence, processed by the base station receiver, whose RTD is 410 μs and frequency offset is 2500 Hz (that is, a double of $\Delta f_{RACH}$). At this time, only one peak exists, and the peak moves forward a double of $d_u$ from the round trip delay.

The $d_u$ of each ZC sequence is determined by inherent characteristics of each sequence. The $d_u$ of all physical root sequences are integers in a range of (1, 419). Table 2 shows p and $d_u$, where the p values and $d_u$ values are corresponding to some root sequences.

TABLE 2 p and $d_u$ corresponding to some physical root sequences

| Physical Root Sequence Number/u | p | $d_u$ | Physical Sequence Number/u | p | $d_u$ |
|---|---|---|---|---|---|
| 1 | 1 | 1 | 431 | 146 | 146 |
| 838 | 838 | 1 | 234 | 692 | 147 |
| 419 | 837 | 2 | 605 | 147 | 147 |
| 420 | 2 | 2 | 17 | 691 | 148 |
| 280 | 3 | 3 | 822 | 148 | 148 |
| 559 | 836 | 3 | 366 | 690 | 149 |
| 210 | 4 | 4 | 473 | 149 | 149 |
| 629 | 835 | 4 | 330 | 689 | 150 |
| 168 | 5 | 5 | 509 | 150 | 150 |
| 671 | 834 | 5 | 50 | 688 | 151 |
| 140 | 6 | 6 | 789 | 151 | 151 |
| ... | ... | ... | ... | ... | ... |

The foregoing analysis based on FIG. 3a to FIG. 3g discloses a set of examples as follows: UEs adopt the same access sequence, and with the same round trip delay, different frequency offsets cause different correlation outputs of the base station receiver. In practice, the base station receives an uplink RACH signal of the UE, and estimates the round trip delay of the UE through characteristics of a correlation output of the sequence, shown in FIG. 3a to FIG. 3g, without knowing the round trip delay of the UE in advance. Illustrations are given through examples in the following.

Figure 4:
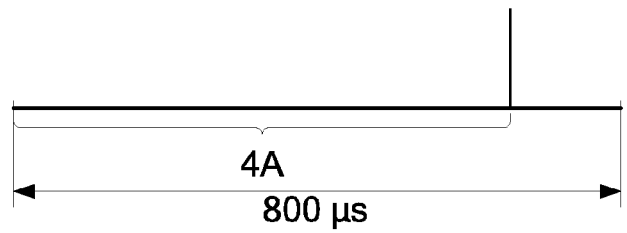
FIG. 4 is a diagram of output of a base station receiver of a UE signal without a frequency offset.
Figure 5:
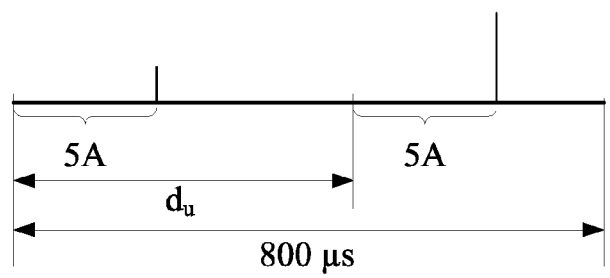
FIG. 5 is a diagram of output of a base station receiver of a UE signal with a frequency offset.

What is shown in FIG. 4 and FIG. 5 are output results of the base station receiver of the UE signals with same access sequence, different RTDs and different frequency offset. The example in FIG. 4 is correlation output of the base station receiver with a UE signal whose RTD=4 A and without a frequency offset. The example in FIG. 5 is correlation output of the base station receiver with a UE signal whose RTD=5 A and with a frequency offset. Large-energy peaks in the two figures are almost in the same position, but in the situation shown in FIG. 5, the base station cannot identify which peak represents the actual RTD.

Figure 6A:
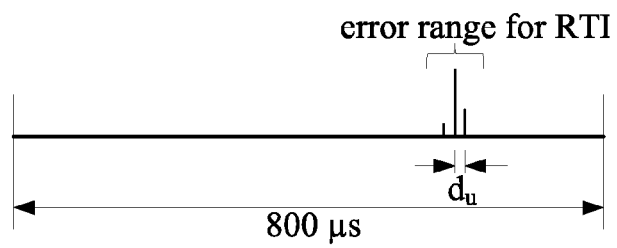
FIG. 6a is a diagram of, output, at a receiver, of a small $d_u$ sequence sent by a UE according to an embodiment.
Figure 6B:
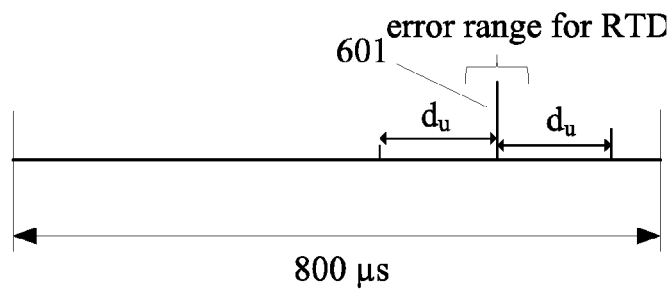
FIG. 6b is a diagram of, output, at a receiver, of a larger $d_u$ sequence sent by a UE according to an embodiment.

FIG. 6a and FIG. 6b are one implementation according to the embodiment of the present invention, assuming that the frequency offset of the uplink signal of the UE in the embodiment is a double of $\Delta f_{RACH}$. Firstly, as in FIG. 6a, the UE first adopts a sequence of a small $d_u$ to transmit, and for ease of description, the sequence is referred to as a small-$d_u$ sequence or a first Zadoff-Chu sequence in the following, for example, such as the access sequences in Table 2 with physical root sequence numbers being 1, 838, 419, 420. FIG. 6a and FIG. 6b are correlation outputs, at the base station receiver, of a UE signal with a frequency offset. Although a magnitude of each peak is different, because these sequences have a small $d_u$ and a cluster of peaks gather in a small area, and because of the peak shift phenomenon as shown in FIG. 3e, high peaks are not necessarily an accurate RTD, and also because the small-$d_u$ sequence is used in the embodiment, the actual RTD are definitely near the cluster of peaks. Therefore, an error range for the RTD can be estimated by this method.

Particularly, as shown in FIG. 6a, if a sequence whose physical root sequence number is 1 or 838 is adopted, and of which $d_u$=1, three peaks are distributed in a range as 2×$d_u$=2×800/839 (μs)≈1.9 μs. Because each OFDM symbol of the communication system has a time length of dozens of μs, a Message 3 message can be demodulated even if an RTD estimation value has an error of several μs. The Message 3 message is also hereinafter referred to as Message 3. The UE access process includes the following steps: sending a preamble sequence by the UE; sending to the UE a Message 2 by the base station; and sending the Message 3 by the UE according to an instruction of the Message 2. Therefore, for the sequence whose $d_u$=1, an approximate RTD can be estimated out although the frequency offset exists. Likewise, the sequence $d_u$=2 can also be basically used to obtain an approximate RTD directly, although the precision of the sequence $d_u$=2 declines.

FIG. 6b is an output of the base station receiver with the UE using a larger $d_u$ random access sequence for the second time in the same geographical location and moving state (that is, the same round trip delay and frequency offset), where each peak differs by a distance of $d_u$ on the time axis span. For ease of description, the larger-$d_u$ random access sequence is also referred to as a second Zadoff-Chu sequence or a larger-$d_u$ sequence. However, because the RTDs of the two access sequences sent by the UE are the same, referring to the estimated error range for the RTD shown in FIG. 6a, only a peak appears in such a range in FIG. 6b, and referring to the schematic analysis in FIG. 3a to FIG. 3g, in the time axis, the position of the peak 601 is an accurate RTD, and the other image peaks are caused by frequency offset.

Unlike the method of estimating the approximate RTD directly through sequences of $d_u$=1 or 2, the precision of the RTD estimated through the method shown in FIG. 6a and FIG. 6b could reach a granularity of each sampling point, that granularity is 800/839 (μs)≈0.95 μs.

Through the foregoing analysis, it can be seen that a constraint relation exists between $d_u$ values of the first Zadoff-Chu sequence and the second Zadoff-Chu sequence. If the frequency offset in this embodiment is a double of $\Delta f_{RACH}$, the $d_u$ of the second Zadoff-Chu sequence is at least greater than double of the $d_u$ of the first Zadoff-Chu sequence. For example, if the $d_u$ of the first Zadoff-Chu sequence is 1, the $d_u$ of the second Zadoff-Chu sequence is 3 or more. For example, if the $d_u$ of the first Zadoff-Chu sequence is 5, the $d_u$ of the second Zadoff-Chu sequence is 11 or more. In this way, from the correlation output peaks of the base station receiver of the second Zadoff-Chu sequence, only one peak may possibly exist in the error range for the RTD in FIG. 6b.

A problem is solved that it is difficult to measure the RTD accurately with the frequency offset state by sending access sequences with different $d_u$ twice, where one of the two sequences has a small $d_u$ and the other has a larger $d_u$. In the processing of the base station receiver, because the base station has functions of collecting and storing signals, the sending order of the two sequences may be reversed, and the sending continuity of the two sequences may be transmitting continuously or transmitting one first, and then after a duration of time, transmitting the other.

Generally, the base station broadcasts information of the RACH channel, such as initial access power and the access sequence that is selected, to the user equipment through a system information block (System Information Block, referred to as SIB). Therefore, configuration parameters of the RACH channel of the present invention may also be broadcast to the UE through the system information block. For example, two access sequences, the order of the two sequences, and transmission timing that are in this embodiment are broadcast to the UE through the system information block. If it is a customized system, it would be unnecessary to obtain information from a broadcast channel, because such a system can let the UE and the base station know the parameter of RACH channel through preset parameter configuration.

Figure 7:
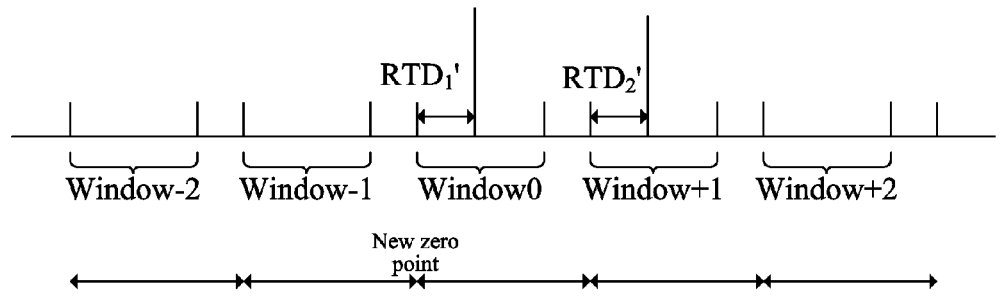
FIG. 7 is a diagram of frequency offset estimation according to an embodiment.

FIG. 7 is a schematic diagram of frequency offset estimation according to an embodiment, and the correlation peaks shown in the figure are output after a cyclic left shift. The extent of the cyclic left shift may be a lower limit of the error range for the RTD which is estimated with the first Zadoff-Chu sequence. The new zero point after the cyclic shift is as shown in the figure, and several windows whose window length is less than the $d_u$ are arranged in sequence from the new zero point in each interval of $d_u$: Window 0, Window+1, and Windown+2. Likewise, Window−1 and Window−2 are arranged inversely from the new zero point. The extent of the cyclic left shift may also be a preset value, and performing the cyclic left shift according to this preset value may make correlation peaks of the first Zadoff-Chu sequence all fall into the Window 0; therefore, the preset value may be selected from one range.

For the second Zadoff-Chu sequence adopted in this embodiment, the p=167 and the value of $d_u$=167, and therefore when the positive frequency offset exists, the image peak shifts 167 sampling points to the right. A maximum peak is found from each detection window, and if a certain peak is greater than the detection threshold, it is considered to be a valid peak. If two or more peaks exist, two maximum peaks are taken as valid peaks.

If two valid peaks exist, when the maximum peak locates in Window 0, and the second maximum peak locates in Window+1, as the two peaks shown in FIG. 7, it is estimated that a frequency offset of the uplink signal of the UE is a value in the range of 0 to $0.5\Delta f_{RACH}$ if two valid peaks exist, when the maximum peak locates in Window+1, and the second maximum peak locates in Window+2, it is estimated that the frequency offset of the uplink signal of the UE is a value in the range of $\Delta f_{RACH}$ to $1.5 \Delta f_{RACH}$. The other similar case can be done analogically.

If two valid peaks exist, and when the magnitudes of two valid peaks are close to each other, one locates in Window 0, and the other locates in Window+1, it is estimated that the frequency offset of the uplink signal of the UE is about $0.5\Delta f_{RACH}$. If two valid peaks exist, and when the two magnitudes of valid peaks are close to each other, one locates in Window+1, and the other locates in Window+2, it is estimated that the frequency offset of the uplink signal of the UE is about $1.5 \Delta f_{RACH}$. The other similar case can be done analogically.

If one valid peak exists, and when the peak locates in Window 0, it is estimated that the frequency offset of the uplink signal of the UE is $\Delta f_{Doppler}=0$ if one valid peak exists, and when the peak locates in Window−1, $\Delta f_{Doppler}=-\Delta f_{RACH}$ If one valid peak exists, and when the peak locates in Window−2, $\Delta f_{Doppler}=-2\Delta f_{RACH}$. The other similar case can be done analogically.

The frequency precision estimated through this method could meet the requirement for demodulating Message 3. For the Zadoff-Chu sequence in this example, p=167. If a Zadoff-Chu sequence whose p=839−167=672 is used in this example, and there is a positive frequency offset, the image peak is equivalent to moving 167 sampling points to the left. At this time, Window+1 and Window+2 are arranged in sequence from Window 0 to the left side, and therefore, Window+1 and Window+2 are not always on the right of Window−1 and Window−2, which are determined by the range of the p value. Preferentially, it is apparent that frequency offset estimation may also be implemented by setting Window 0, Window+1, Window−1, Window+2, and Window−2 based on the RTD or the error range for the RTD without the cyclic left shift. According to the error range for the RTD or the RTD, the base station may further identify a frequency offset which is corresponding to peaks of a correlation output Power Delay Profile PDP of the second Zadoff-Chu sequence, and estimate out the frequency offset of the signal of the user equipment. After the frequency offset of the uplink signal of the UE is obtained, an offset may be rectified when the base station demodulates an uplink signal of the UE, which makes the base station have better demodulation performance for the message.

Meanwhile, FIG. 7 also illustrates a method for calculating the RTD. In the figure, RTD1' is a delay calculated from the new zero point, the RTD of the UE may be calculated through the following method: RTD=a distance of the cyclic left shift+RTD1'. Because neighboring peaks are integer fold of $d_u$ away from each other, RTD1' and RTD2' are basically equal to each other, so that the RTD may also be calculated and obtained through the following method: RTD=the distance of the cyclic left shift+RTD2'. The method of calculating the RTD through the RTD2' is especially applicable to the case where an integral multiple $\Delta f_{RACH}$ of a frequency offset occurred, because at this time no peak exists at the RTD position, and the image peak falls at the position which shifts integral fold of $d_u$ from the RTD.

Apparently, the distance of the cyclic left shift may also be other values, as long as the peak is within a window whose length is less than $d_u$.

Through the foregoing embodiments, the method that the UE sends two random access sequences is described, where one sequence is used to estimate the error range for the RTD, and the other is used to estimate the frequency offset of the signal of the UE or the RTD of the signal of the UE. Embodiments of a user equipment apparatus, a user equipment method, a base station apparatus, and a base station method are described in the following.

Figure 8:
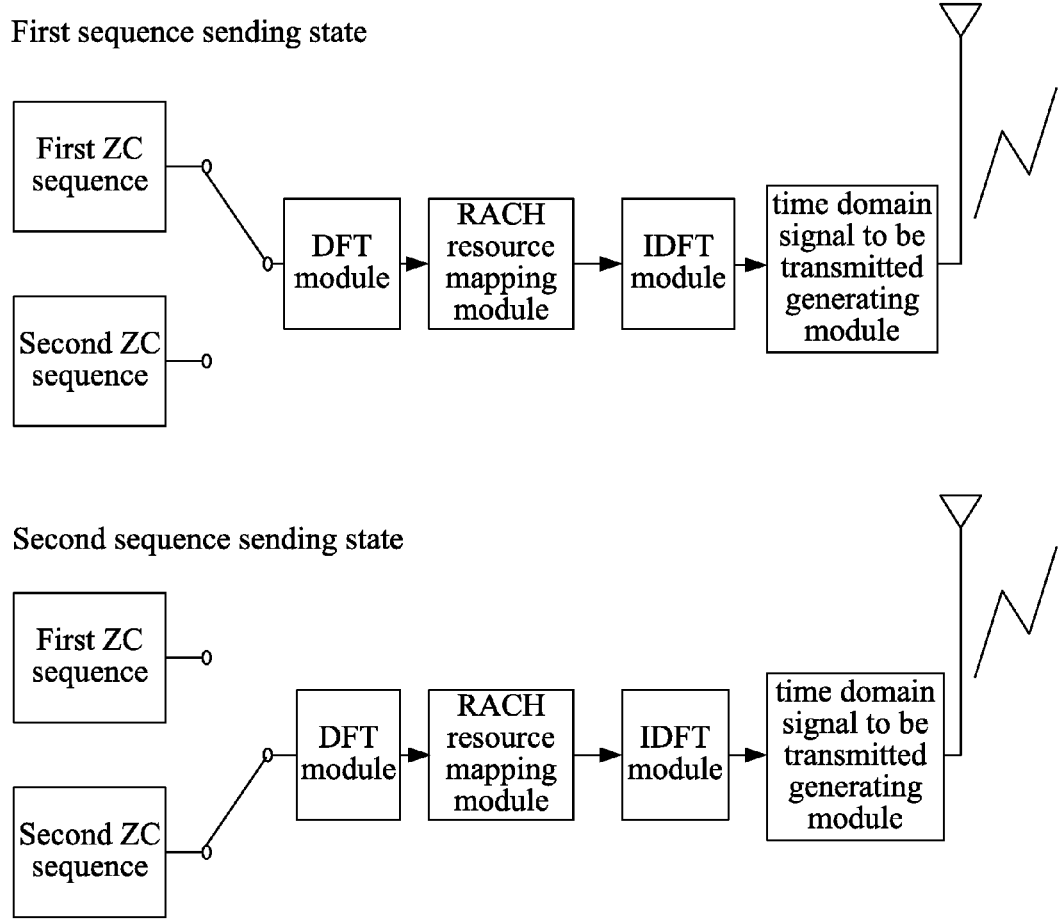
FIG. 8 is a structural diagram of a user equipment embodiment.

FIG. 8 illustrates an embodiment of a user equipment of the present invention.

A memory in the user equipment stores a first ZC sequence and a second ZC sequence, and the $d_u$ of the first ZC sequence is smaller than the $d_u$ of the second ZC sequence. The two sequences are processed sequentially through a Discrete Fourier Transform (DFT) module and an RACH resource mapping module, and are mapped to a frequency band where an RACH channel locates to generate a frequency domain signal. A general baseband module is described here to perform frequency domain/time domain processing on ZC sequences, and such baseband processing may also have other algorithms, for example, the frequency domain signal is generated through a shift of a frequency spectrum after up-sampling filtering. And then a time domain signal is generated through an Inverse Discrete Fourier Transform (IDFT) module, and is finally transmitted over an antenna after being processed by a radio frequency module. The first ZC sequence is used by a base station to identify an error range for a RTD, and the second ZC sequence is used to identify a precise position of the RTD or a frequency offset of an uplink signal of the UE.

In the processing of a base station receiver, because the base station has functions of collecting and storing signals, the sending order of the two sequences can be reversed, and sending continuity of the two sequences may be transmitting continuously or transmitting one first and waiting a duration to transmit the other. The two ZC sequences may be obtained from a broadcast channel in a communication cell by the receiver of the user equipment, and the broadcast channel may also provide the following information: two access sequences, the order of the two sequences, and transmission timing. The UE usually obtains a sequence number of the ZC sequences from the broadcast channel, and the UE is configured with a ZC sequence generating module to generate ZC sequences according to ZC sequence number. The two ZC sequences may also be obtained locally by means of configuration, and a system may let the UE and the base station know parameter of the RACH channel through preset parameter configuration.

Figure 9:
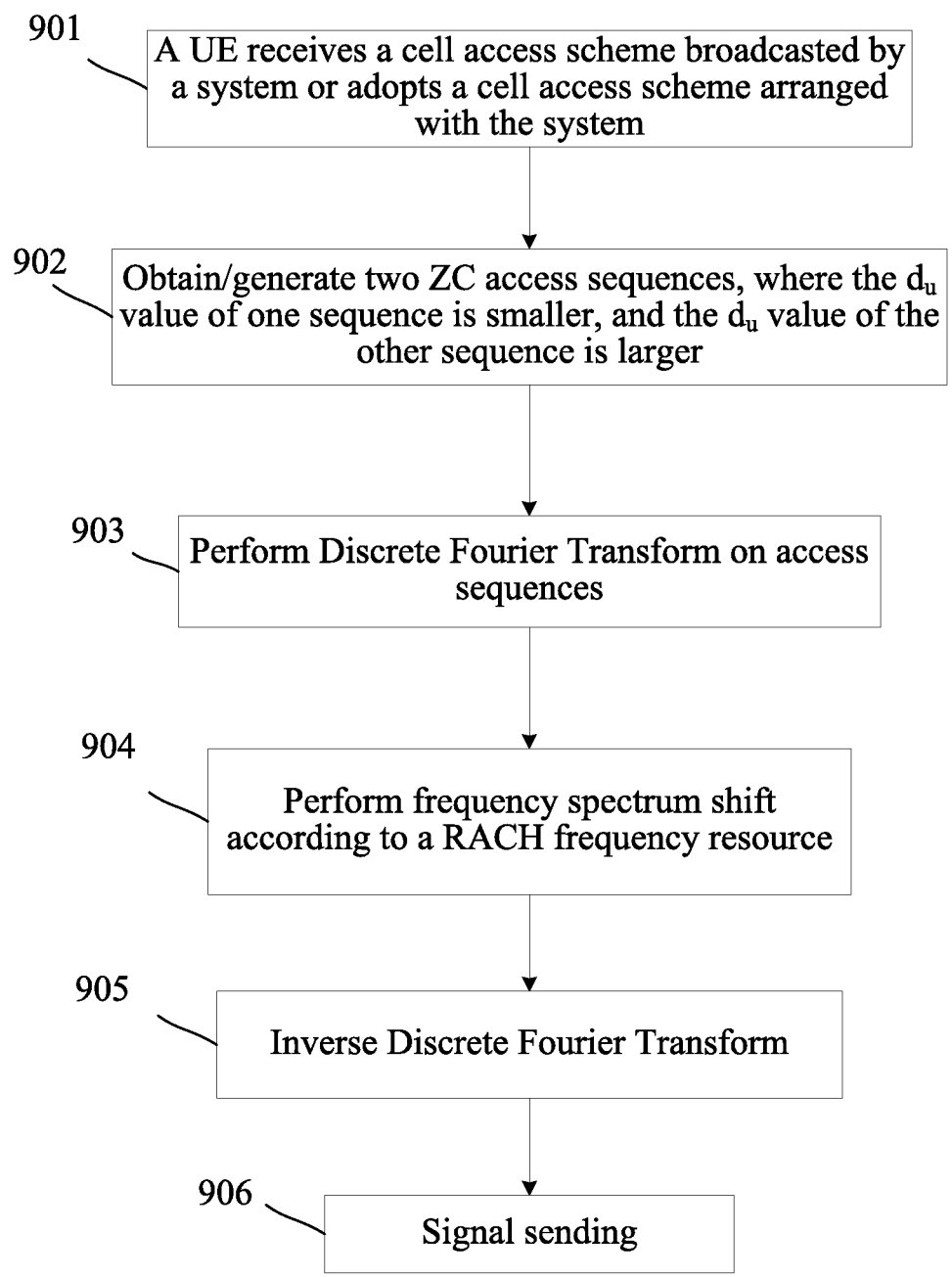
FIG. 9 is a flow chart of a user equipment embodiment.

FIG. 9 is a flow chart of a user equipment embodiment of the present invention.

Step 901: The UE receives a cell access scheme broadcasted by a system or adopts a cell access scheme arranged with a system. The UE obtains RACH information of a current cell from a broadcast channel, and the broadcast channel may provide the following information: two access sequences, the order of the two sequences, and transmission timing. If the UE is a customized terminal, it may be unnecessary to obtain information from the broadcast channel, because access sequences and an access scheme of the RACH can be preconfigured locally.

Step 902: Obtain or generate a first ZC sequence and a second ZC sequence, where the $d_u$ of the first ZC sequence is smaller than the $d_u$ of the second ZC sequence.

Step 903: Perform a DFT (Discrete Fourier Transform) operation, and transform ZC sequences from a time domain signal to a frequency domain signal.

Step 904: Map the ZC sequences in the frequency domain to a frequency band where the resources of RACH channel is located through resource mapping.

Step 905: Perform IDFT (Inverse Discrete Fourier Transform) on a frequency domain signal generated in the foregoing steps.

Step 906: Generate a transmittable signal to be transmitted over an antenna. The two sequences are used by a base station to identify an error range for a RTD, and a precise position of the RTD or a frequency offset of an uplink signal of the UE. In the processing of the base station receiver, because the base station has functions of collecting and storing signals, the sending order of the two sequences can be reversed, and the sending continuity of the two sequences may be transmitting continuously or transmitting one first and waiting a duration to transmit the other.

Figure 10:
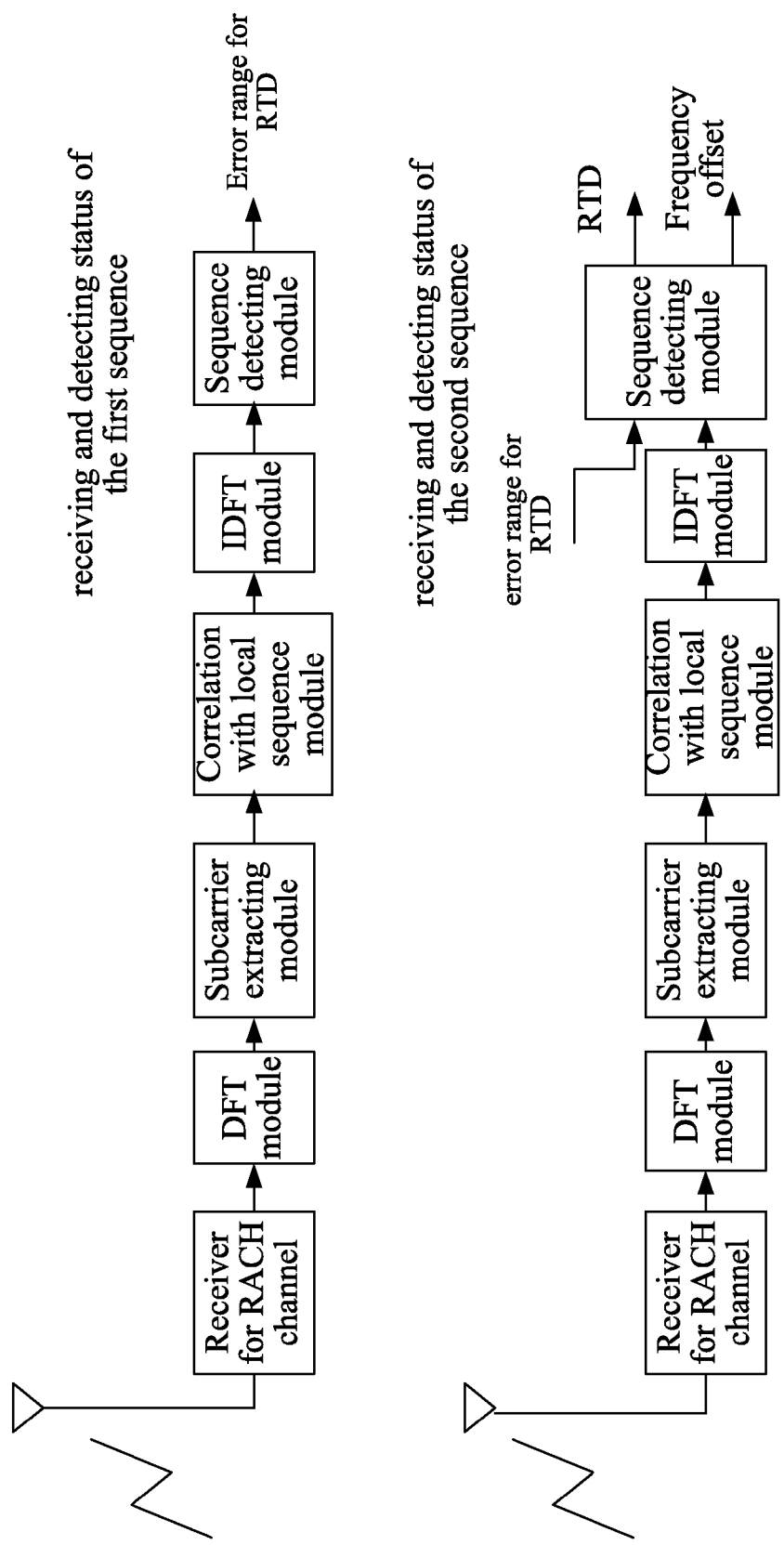
FIG. 10 is a structural diagram of a base station.

FIG. 10 is a schematic diagram of a base station according to the present invention, which schematically shows a hardware status of a base station receiver which processes the two access sequences of a UE.

The receiver receives an RACH signal sent by a terminal, where the signal includes a first ZC sequence and a second ZC sequence, and the $d_u$ of the first ZC sequence is smaller than the $d_u$ of the second ZC sequence. A frequency domain signal is generated from the received RACH signal in a time domain through a Discrete Fourier Transform DFT module, and information about the frequency domain resource of RACH is extracted through a subcarrier extracting module. A general baseband module is described here to perform frequency domain/time domain processing on ZC sequences, and such baseband processing may also have other algorithms, for example, the frequency domain signal is generated through a shift of frequency spectrum after down-sampling filtering. And then, according to the first ZC sequence and the second ZC sequence configured for the access channel, a correlation with local sequence is performed on signals received on an RACH channel, and then a detected sequence is output through an IDFT module. After amplitude discrimination is performed on the detected sequence, one or more correlation peaks remain, and an output of the detected sequence is similar to one of various Power Delay Profiles which are shown in FIG. 3a to FIG. 3g. An error range for the RTD is output after the first ZC sequence is detected by the sequence detecting module. After the second ZC sequence is detected, the sequence detecting module identifies an RTD value according to the error range for the RTD estimated for the first time.

In addition, after the second ZC sequence is detected, the sequence detecting module estimates out the frequency offset of the uplink signal of a UE by taking the estimated error range for the RTD as input.

There is also another working state. After the second ZC sequence is detected, the sequence detecting module first obtains the RTD through the estimated error range for the RTD, and then takes the RTD as an input to estimate out the frequency offset of the uplink signal of the UE. The method for estimating the frequency offset may be implemented through hardware logic or a computer program, which can refer to an implementation method that is described in FIG. 7 and would not be repeatedly described here again.

A number of variation methods may be used to perform baseband processing on the RACH channel. For example, local sequence correlation may be implemented in the frequency domain. No matter which possible variation method is adopted, a result of a correlation calculation is output finally. Therefore, various possible baseband processing algorithms should be within the protection scope of the present invention.

In the two detection of sequence processed by the base station, because the first ZC sequence is a small-$d_u$ sequence and the second ZC sequence is a larger-$d_u$ sequence, the error range for the RTD can be estimated out according to the ZC sequence of the first time. Then the RTD or the frequency offset of the uplink signal of the UE is estimated out according to the this range and correlation output of the larger-$d_u$ sequence.

Preferentially, the base station includes a broadcast channel module, which is configured to inform the UE of parameters of the RACH channel, the first ZC sequence, and the second ZC sequence.

Figure 11:
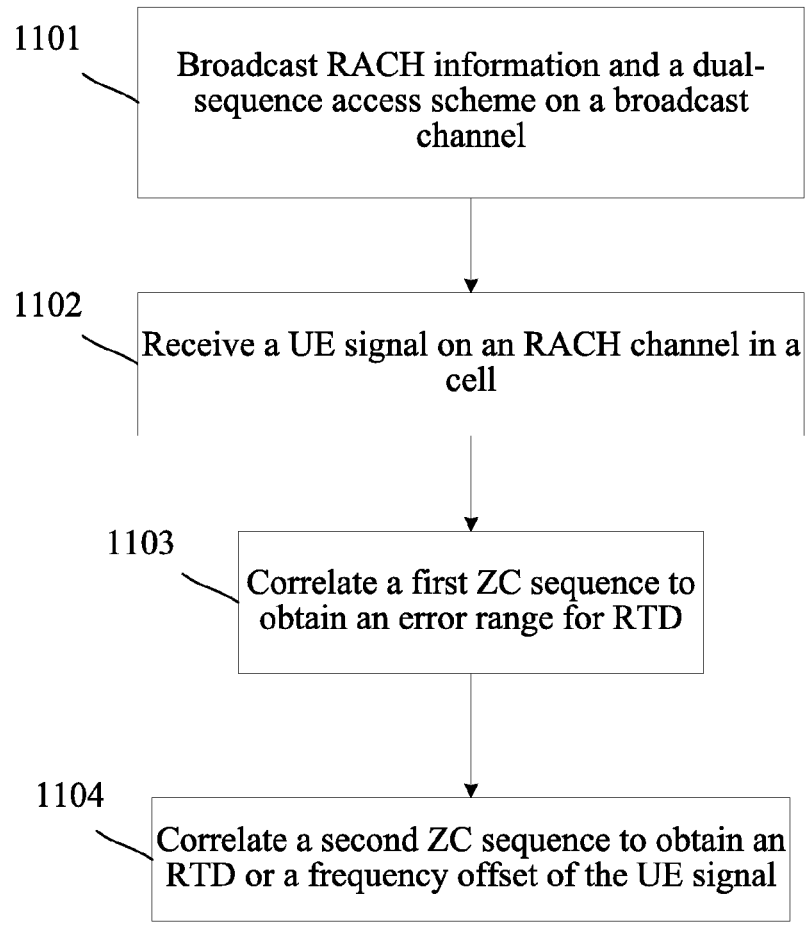
FIG. 11 is a flow chart of a base station method embodiment.

FIG. 11 is a flow chart of a base station method embodiment according to the present invention.

Step 1101: Broadcast access scheme of an RACH channel over a broadcast channel, where a first ZC sequence and a second ZC sequence that are used by the RACH channel are included. The RACH channel may be distinguished according to times of sending access sequences: the UE may send the access sequences in twice or the UE may continuously send two access sequences once. The order of sending two different $d_u$ sequences may be distinguished: a small-$d_u$ sequence may be sent first or a larger-$d_u$ sequence may be sent first. However, such sending scheme needs to be consistent between the base station and the UE. Therefore, the foregoing described RACH information can be broadcast to the UE in a cell through the broadcast channel. The RACH channel information may also be preconfigured through a customized UE and a customized base station.

Step 1102: The base station captures a signal of the UE over the RACH channel. Accordingly, the signal sent by the UE includes a first Zadoff-Chu sequence and a second Zadoff-Chu sequence, where the $d_u$ of the first Zadoff-Chu sequence is smaller than the $d_u$ of the second Zadoff-Chu sequence.

Step 1103: The base station obtains an error range for a RTD through processing on the first ZC sequence. If $d_u$ of the sequence that is used is very small, the error range for the RTD can be regarded as an approximate RTD, which can meet the requirement for demodulation. Because the order of sending of the first ZC sequence and the second ZC sequence is not limited, therefore, here the receiving and processing the first ZC sequence by the base station does not depend on whether the UE sends the second ZC sequence.

Step 1104: The base station may obtain a precise RTD through processing on the second ZC sequence, and may also obtain a frequency offset of an uplink signal of the UE through processing on the second ZC sequence.

A carrier frequency of a mobile communication system may be from hundreds of MHz to several GHz, for example, what is usual is from 850 MHz to 3.5 GHz. When a movement direction of the UE is towards or away from a direction to a base station antenna, a maximum Doppler frequency shift occurs. Further because a base station downlink signal obtained by the UE in a moving state has the Doppler frequency shift, the UE locks to a base station carrier frequency with the frequency offset and then performs uplink transmission, and the Doppler frequency shift received by the base station antenna is superposition of uplink frequency shift and downlink frequency shift. For example, for a communication system which adopts the carrier frequency from 900 MHz to 2.7 GHz, when radial velocity of the UE to the base station antenna reaches 1200 km/h, the maximum frequency offset of the uplink signal received by the base station is 2000-6000 Hz. According to the definition of the 3GPP TS 36.211 standard, RACH subcarrier bandwidth is 1250 Hz. In this way, the correlation result output by the base station receiver is an offset which is twice to five times of the $d_u$ is generated.

Figure 12:
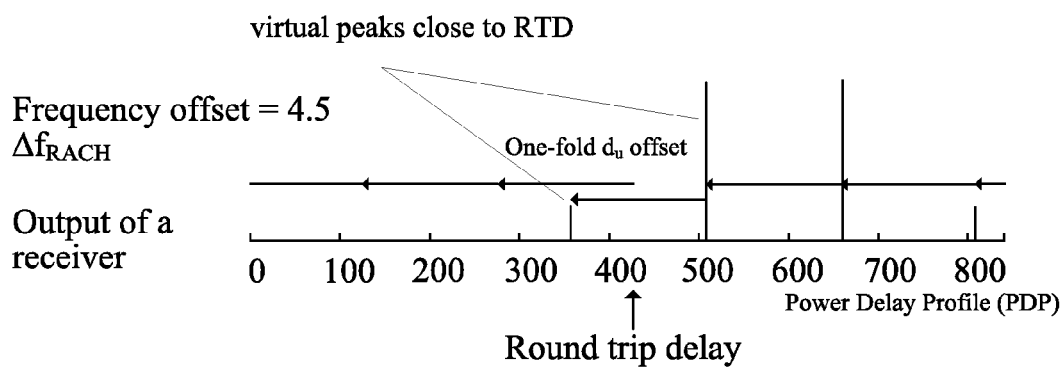
FIG. 12 is a diagram of correlation output when a frequency offset of a UE signal is 4.5-fold to $\Delta f_{RACH}$ according to an embodiment.

FIG. 12 is a result that the Doppler frequency shift is 4.5-fold of $\Delta f_{RACH}$ under the condition that the ZC sequences and the RTD are the same as those shown in the embodiments in FIG. 3a to FIG. 3g. At this time, two image peaks with a similar magnitude appear at positions where four-fold of $d_u$ and five-fold of $d_u$ to the left. Owing to a cyclic shift characteristic of the shifted peaks on a Power Delay Profile, the image peak that moves six-fold of $d_u$ to the left is caused to move to a position that is close to an actual RTD. Therefore, through the method shown in FIG. 6, the image peak with a cyclic shift beyond 800 μs possibly appears in the error range for the RTD obtained by processing the first ZC sequence signal, which interferes the detection of the RTD. Therefore, the $d_u$ is not the larger the better when a larger-$d_u$ sequence is selected, and the selection is based on that its offset peaks may not be cyclically overlapped to the error range for the RTD. For example, when a maximum frequency offset allowed by the system is a double of $\Delta f_{RACH}$, the image peaks may be at positions of RTD, RTD$-d_u$, RTD$-2d_u$, and RTD$-3d_u$. To make the peaks of the RTD and RTD$-3d_u$ not overlap, preferentially, a protection distance of one-fold $d_u$ is reserved in the middle, and then an upper limit of the $d_u$ of the larger-$d_u$ sequence is 839/4≈210.

A lower limit of the $d_u$ of the larger-$d_u$ sequence and the upper limit of the $d_u$ of the small-$d_u$ sequence affect to each other, which will be introduced in the following.

As shown in FIG. 6a and FIG. 6b, for a group of peaks output under a condition of the frequency offset, the error range for the RTD can be more precisely estimated if $d_u$ is smaller, and therefore, the lower limit of $d_u$ of the first ZC sequence could be $d_u=1$. However, because there are only two sequences whose $d_u=1$, the sequences are not enough when the system has a large number of UEs which need random access, so that other Zadoff-Chu sequences whose $d_u$ is far greater than 1 need to be selected.

Figure 13:
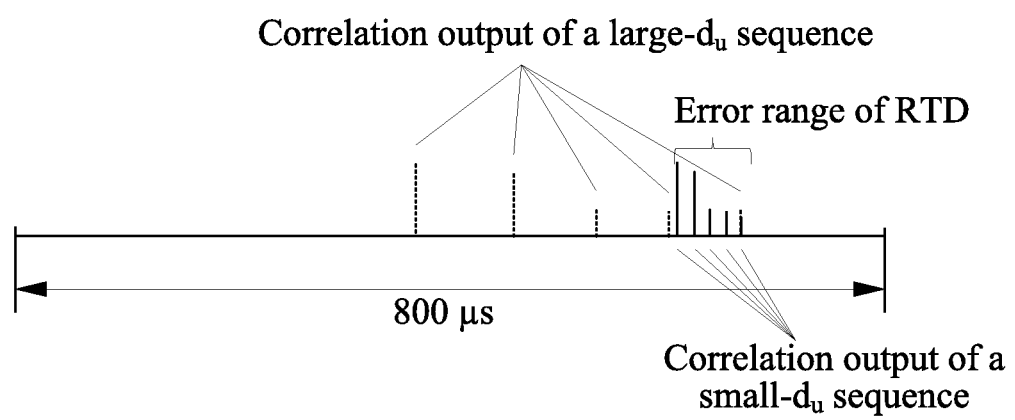
FIG. 13 is a diagram of correlation outputs of two sequences with a same RTD.

FIG. 13 is output results, at a receiver, of uplink access initiated by two UE signals with the same RTD and the same frequency offset using a small-$d_u$ sequence and a larger-$d_u$ sequence. To indicate the differences, peaks represented in a dotted line are a correlation result of the larger-$d_u$ sequence, and peaks represented in a solid line are a correlation result of the small-$d_u$ sequence. For the result of the larger-du sequence, besides one peak which is within the range of a cluster of small-$d_u$ sequence peaks, the other peaks all fall outside the range of the cluster of small-$d_u$ sequence peaks. Therefore, if an actual RTD is not known in advance, it may also be determined through an error range for the RTD estimated by the small-$d_u$ sequence peaks that the position of an only larger-$d_u$ sequence peak is the actual RTD. This example is based on that a maximum frequency offset allowed by the system is four-fold of $\Delta f_{RACH}$. To distinguish all image peaks of the larger-du sequence from the error range for the RTD estimated by the small-$d_u$ sequence, a $d_u$ of the larger-$d_u$ sequence at least needs to be greater than four times of the $d_u$ of the small-$d_u$ sequence. It indicates that a lower limit of the $d_u$ of the larger-$d_u$ sequence and an upper limit of the $d_u$ of the small-$d_u$ sequence have been affected by each other. Preferentially, if the maximum frequency offset allowed by the system is a double of $\Delta f_{RACH}$, the $d_u$ of the larger-$d_u$ sequence at least needs to be greater than or equal to three times of the $d_u$ of the small-$d_u$ sequence.

The foregoing describes a mutual relation of $d_u$ values of two sequences from the point of view of estimating the RTD. With reference to a frequency offset estimating method shown in FIG. 7, the system with the frequency offset being the double of $\Delta f_{RACH}$ needs five windows to estimate the frequency offset, and if it is a system with a frequency offset being N-fold of $\Delta f_{RACH}$, 2N+1 windows are required. A $d_u$ of the second Zadoff-Chu sequence needs to be smaller than or equal to 839/(2N+1). In this way, the number of selectable Zadoff-Chu sequences is further reduced again.

Preferentially, a method for selecting a larger-$d_u$ sequence and a small-$d_u$ sequence is provided. For a system with a maximum frequency offset being a double of $\Delta f_{RACH}$, the larger-$d_u$ sequence is selected from sequences with a near to $d_u$=167. If the number of sequences required is N, $d_u$ of the selected sequence is in a range of (167−4N/5~167+N/5). A corresponding upper limit of $d_u$ of the small-$d_u$ sequence may be determined through the method shown in FIG. 7. That is, the upper limit of $d_u$ of the small-$d_u$ sequence is smaller than one fifth of the upper limit of $d_u$ of the larger-$d_u$ sequence. The lower limit of the $d_u$ of the small-$d_u$ sequence is 1. It can be known from the foregoing description that the number of available small-$d_u$ sequences and larger-$d_u$ sequences is limited, and if there are more small-$d_u$ sequences selected, the fewer larger-$d_u$ sequences would be selected, and vice versa. The embodiment of the present invention needs to use one small-$d_u$ sequence and one larger-$d_u$ sequence at one time of random access, and therefore, the equal number of small-$d_u$ sequences and larger-$d_u$ sequences are usually configured.

Preferentially, a method for selecting a larger-$d_u$ sequence and a small-$d_u$ sequence is provided. For a system with a maximum frequency offset: K-fold of $\Delta f_{RACH}$, if the number of sequences required is N, $d_u$ of all the sequences is in a range of $$\left(\frac{839-2KN}{2K+1}, \frac{839+N}{2K+1}\right).$$

An upper limit of $d_u$ of corresponding small-$d_u$ sequences is 1/K of the lower limit of the $d_u$ of the larger-$d_u$ sequence.

Through the foregoing method, a first ZC sequence group and a second ZC sequence group may be determined. Any sequence in the one group may be paired to use with any sequence in the other group.

Preferentially, a first ZC sequence group and a second ZC sequence group may be determined. One sequence in one group is constantly paired to use with one sequence in the other group. Table 3 incompletely lists available access sequence pairs.

TABLE 3

Paired physical root sequence numbers and their p values and $d_u$ values

| Sequence Pair No. (Serial Number) | Physical Root Sequence Number/u | p | $d_u$ | Physical Root Sequence Number/u | p | $d_u$ |
|---|---|---|---|---|---|---|
| 0 | 1 | 1 | 1 | 13 | 710 | 129 |
| 1 | 838 | 838 | 1 | 826 | 129 | 129 |
| 2 | 419 | 837 | 2 | 71 | 130 | 130 |
| 3 | 420 | 2 | 2 | 768 | 709 | 130 |
| 4 | 280 | 3 | 3 | 269 | 131 | 131 |
| 5 | 559 | 836 | 3 | 570 | 708 | 131 |
| 6 | 210 | 4 | 4 | 375 | 707 | 132 |
| 7 | 629 | 835 | 4 | 464 | 132 | 132 |
| 8 | 168 | 5 | 5 | 82 | 706 | 133 |
| 9 | 671 | 834 | 5 | 757 | 133 | 133 |
| ... | ... | ... | ... | ... | | ... |

Preferentially, a pair of one specific ZC sequence and the other specific ZC sequence may also be generated. In this way, a difference of $d_u$ values in each pair of two ZC sequences may be determined individually without corresponding to a $d_u$ range of the foregoing entire sequence group. Therefore, this method can determine more sequence pairs, and is more flexible in actual use.

Apparently, the foregoing analysis for the $d_u$ range of the small-$d_u$ sequence (the first ZC sequence) and the larger-$d_u$ sequence (the second ZC sequence) is only an example, and sequences with better performance may be selected from a number of sequences within the range. Therefore, a similar solution only selecting some sequences in the foregoing range also adopts a concept that is the same as that of the present embodiment.

The following is a better integrated embodiment. To enable the system to work in a case of multiple UEs, ZC sequences are sorted in advance. The sequences with small $d_u$ are sorted as a first group, the sequences with larger $d_u$ are sorted as a second group, and the UE selects a random access sequence from the two sequence groups respectively when needing to send two random access sequences. Not all $d_u$ values of the sequences in the first sequence group are equal. Therefore, the precision of the error ranges of the RTD estimated by using different sequences may be different. But because the system requires access of a number of UEs, it is impossible that only sequences with minimum estimated precision are selected, and in fact, the more the sequences are needed, the sequences with worse estimated precision would be selected. In the first group, it is assumed that the maximum $d_u$ is 30. Therefore, as a collective whole, their estimated precision can be represented by using the maximum $d_u$. A common characteristic of sequences of the second group in the embodiment is that du is larger. For example, the $d_u$ of sequences of the second group is in the range of 129-200. Therefore, when one sequence in the second group is adopted to send, it can be ensured that there would not be two peaks in 129 unit of time. In this way, when each cell needs more access sequences due to access of a large number of UEs, it will be convenient due to such unified processing.

Figure 14:
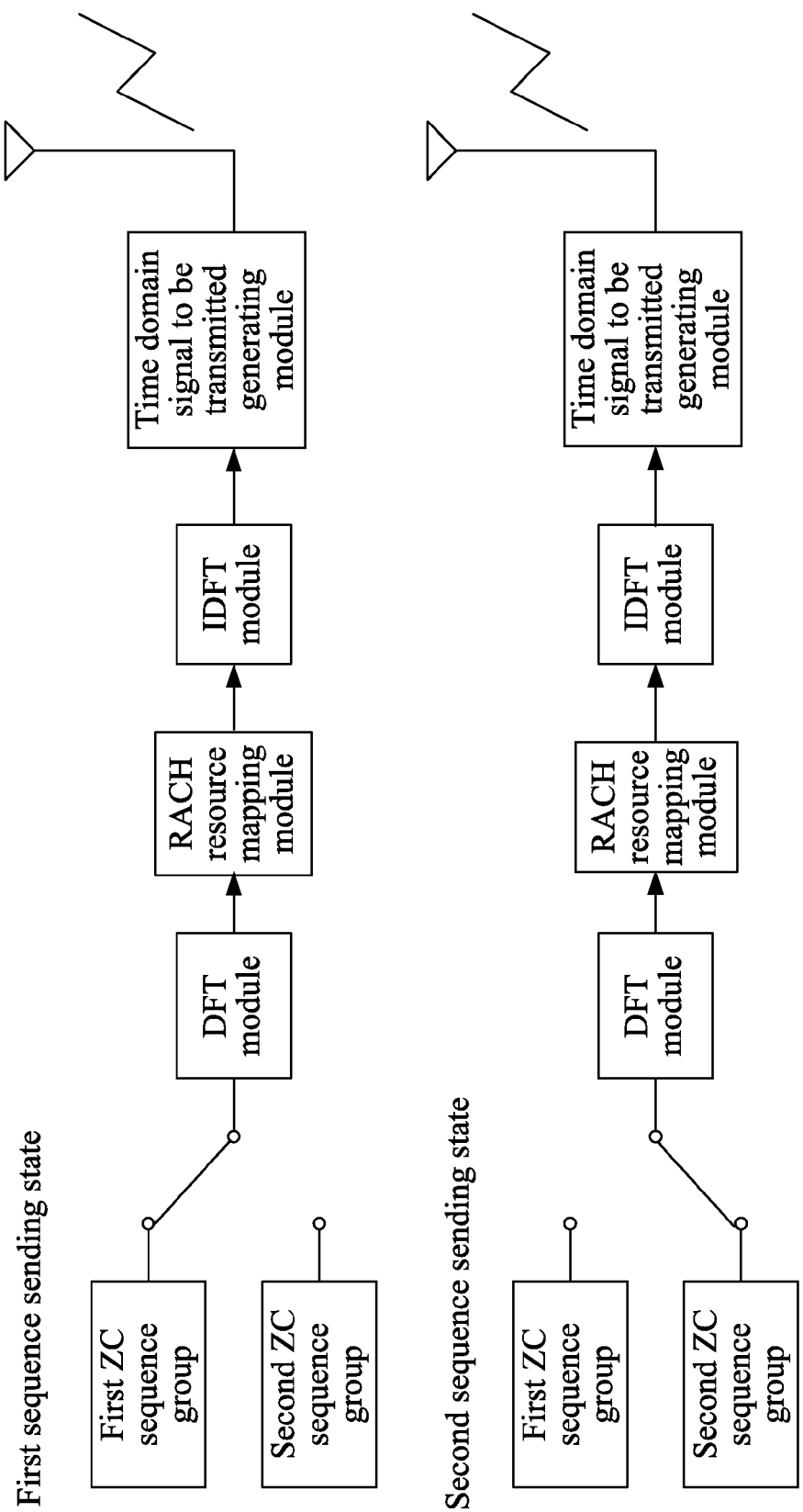
FIG. 14 is a structural diagram of another user equipment embodiment.

FIG. 14 is a structural diagram of another user equipment embodiment according to the present invention. A first ZC sequence group and a second ZC sequence group that are stored in a memory are two groups of sequences with different $d_u$ value characteristics. When one sequence in one group is selected by the UE for sending, the sequence is processed by a Discrete Fourier Transform (DFT) module and mapped to a frequency band where an RACH resource is located by an RACH resource mapping module, and then a frequency domain signal passes through an Inverse Discrete Fourier Transform (IDFT) module and a time domain signal is generated to be transmitted over an antenna. One sequence in the other ZC sequence group is sent after similar signal processing is performed. The two sequences are used, respectively, by a base station to identify an error range for a RTD, and to identify the RTD or a frequency offset of an uplink signal of the UE. The two sequences come from two groups respectively, and may also come from a random access sequence pair that is fixedly paired.

Figure 15:
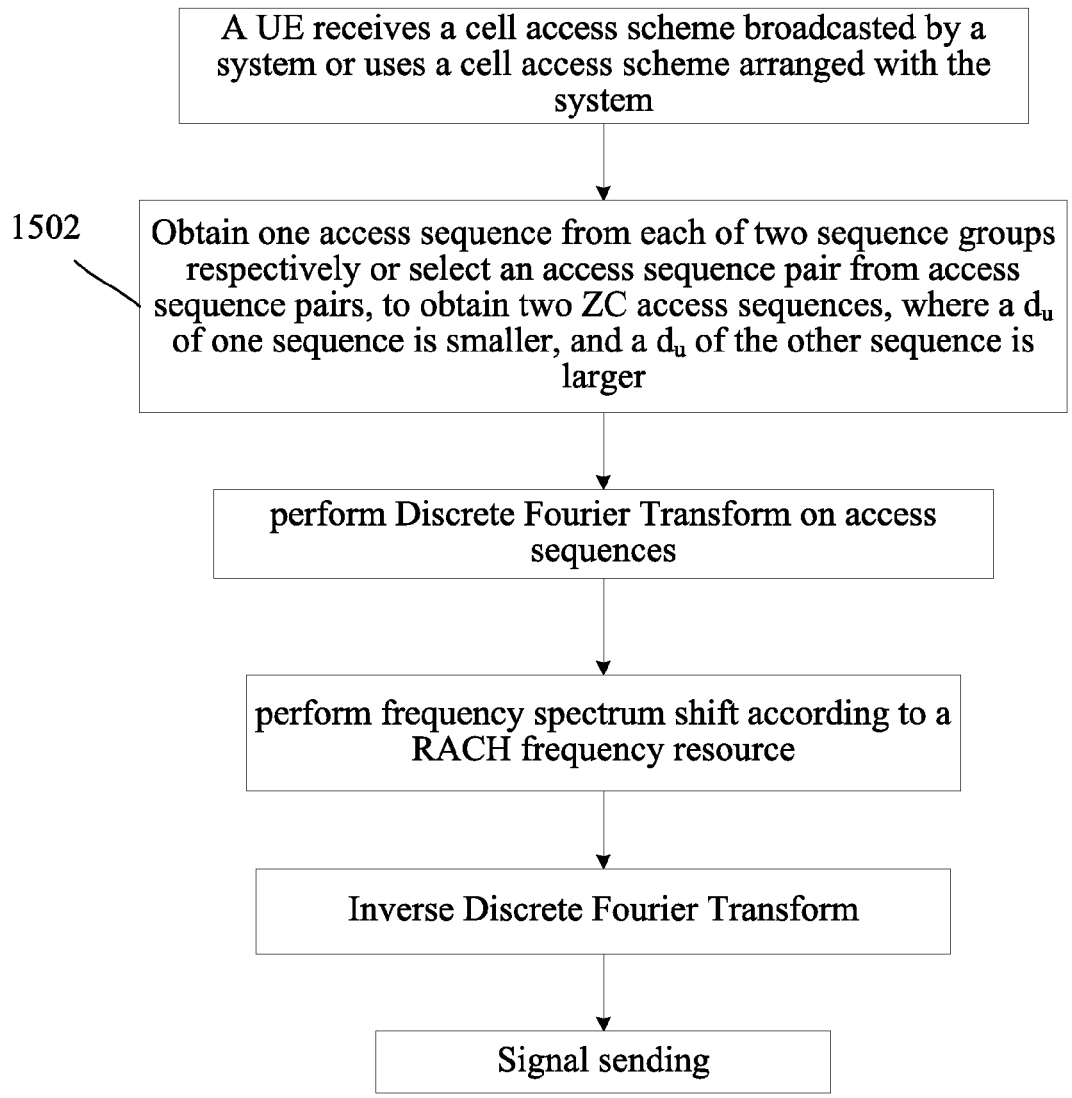
FIG. 15 is a flow chart of another user equipment embodiment.

FIG. 15 is a flow chart of another user equipment embodiment according to an embodiment of the present invention. To adapt to the operation scheme using multiple groups of access sequences, step 1502 is introduced: obtaining two access sequences respectively from two sequence groups or selecting an access sequence pair from access sequence pairs, to obtain two ZC access sequences, where the $d_u$ of one sequence is small, and the $d_u$ of the other sequence is larger.

Figure 16:
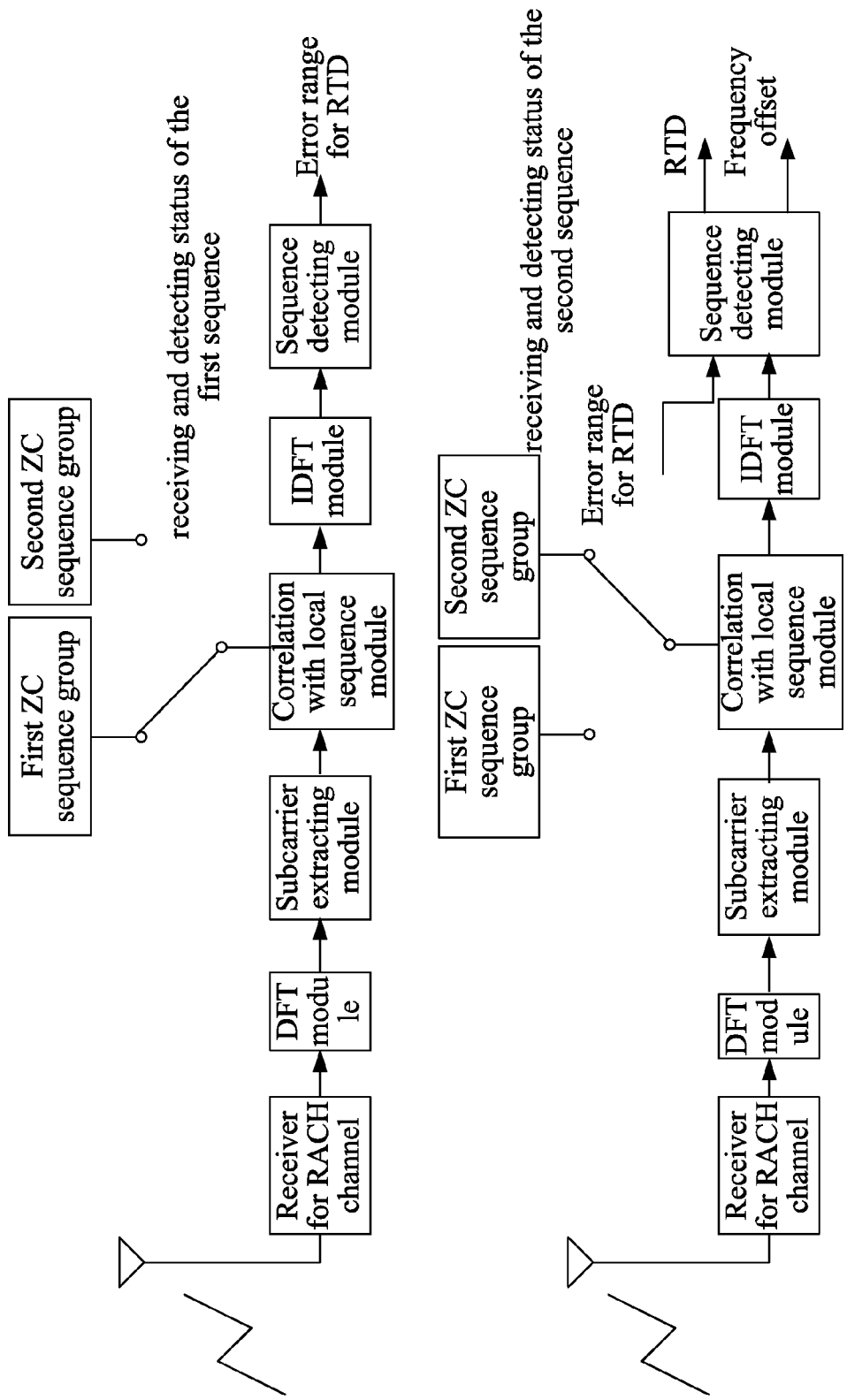
FIG. 16 is a structural diagram of another base station embodiment.

FIG. 16 is a structural diagram of another base station embodiment according to the present invention. Also, to adapt to the operation scheme using multiple groups of multiple access sequences, in addition to an apparatus in FIG. 10, two sequence group storing units are added and configured to store a first Zadoff-Chu sequence group and a second Zadoff-Chu sequence group. When correlation processing is performed on uplink signals of an RACH channel, the base station selects access sequences which are configured by a communication system from two storing units as input of a correlation module. Preferentially, the base station includes a broadcast channel module, which is configured to inform a UE of parameters of the RACH channel, as well as the first ZC sequence group, and the second ZC sequence group.

In another implementation of the embodiment, the base station has a sequence pair storing unit which is configured to store ZC sequence pairs, and each ZC sequence pair includes the first Zadoff-Chu sequence and the second Zadoff-Chu sequence.

Figure 17:
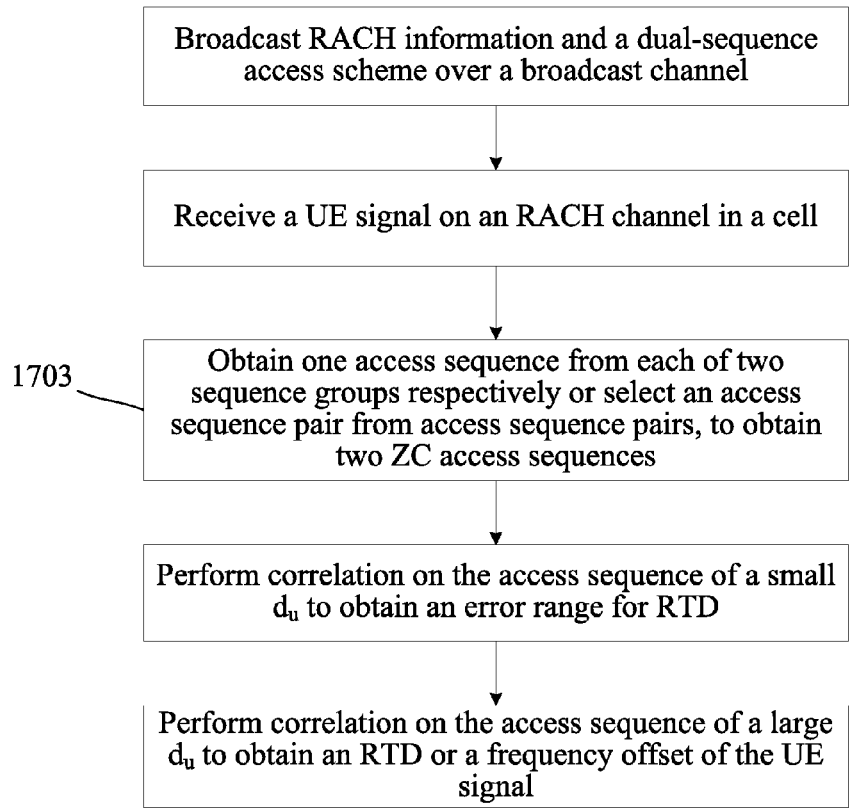
FIG. 17 is a flow chart of another base station method embodiment.

FIG. 17 is a flow chart of another base station method embodiment of the present invention. Also, to adapt to the operation scheme using multiple groups of access sequences, step 1703 is introduced: obtaining one access sequence respectively from two sequence groups or selecting an access sequence pair from access sequence pairs, to obtain two ZC access sequences.

A high-speed communication access system is often accompanied with wide coverage. Because the Specification limits a Timing Advanced (hereinafter referred to as TA) range to 0-1282, when the UE locates more than 100 km away from the base station, the uplink signals cannot be aligned with the timing of the e-NodeB, thereby damaging the orthogonality of an OFDM system. To break through the limitation of the existing Specification, a preferential implementation of the embodiment is provided here, when the UE is more than 100 km away, by sending a greater TA, its uplink signal can be delayed one Slot and aligned with the timing of e-NodeB (in a Normal CP manner of the 3GPP Specification), so as to maintain the orthogonality of OFDM symbols. For an Extended CP manner of the 3GPP Specification, since the CP lengths of each symbol are the same, the uplink signal can be aligned by delaying an integral number of SC-OFDM symbols.

Figure 18:
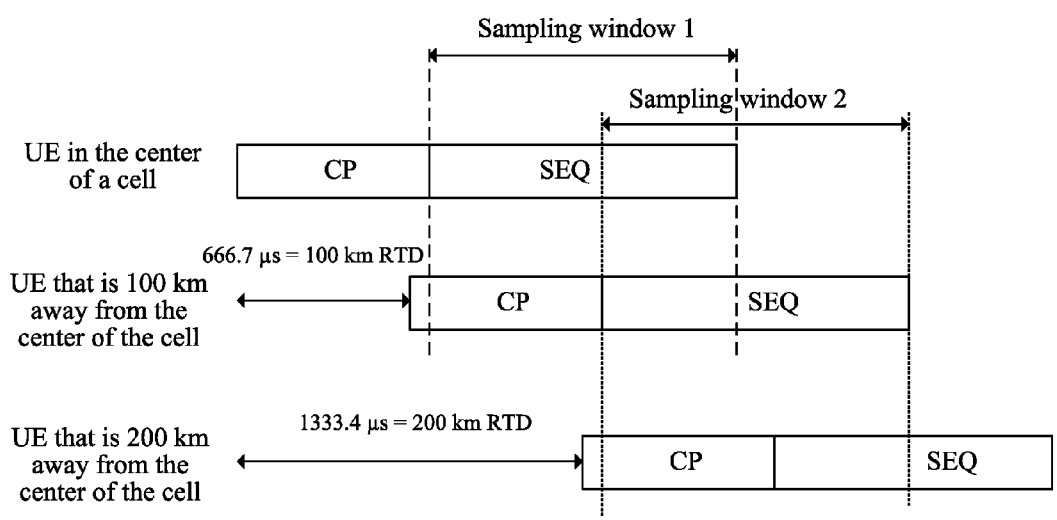
FIG. 18 is a diagram of timing of an access sequence received by a large-cell base station.

The new embodiment provided here is one of the implementation methods for enlarging cell coverage. For large-cell coverage, in the solution as shown in FIG. 18, the range outside 100 km can be covered, the UE can sample signals once again after a normal RACH signal sampling time, and the two sampled signals are correlated with a local ZC sequence respectively.

Figure 1:
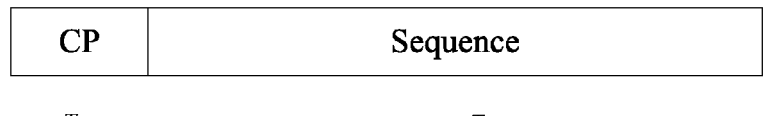
FIG. 1 is a diagram illustrating a physical layer access sequence in the prior art.

For example, the communication cell has a cell radius of 200 km. According to an RACH channel structure shown in FIG. 1, when format 3 is adopted, $TCP=21024 \cdot T_s$. When a transmission delay of the UE is equal to or less than 100 km, as long as a sampling window 1 is set reasonably, the UE signal of a full period can be sampled with the sampling window 1, as CP part is generated by a cyclic shift of a SEQ part. However, when the transmission delay of the UE is between 100 km and 200 km, it is unable to capture a full period of signal by sampling through the sampling window 1, and a sampling window 2 is added thereafter. In this way, there are two windows and it is ensured that at least one can sample a signal of a full period, and therefore, the coverage to 200 km cell radius is achieved. Accordingly, the method of two windows can also be used to estimate any possible error range for RTD or RTD in the cell.

Figure 19:
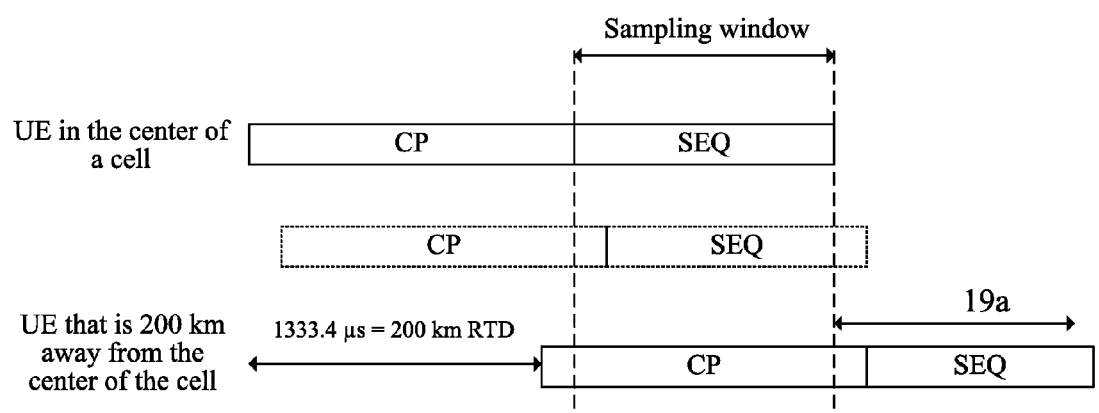
FIG. 19 is a diagram of timing of a sampling window for a lengthened CP.

However, some base stations only can process one sampling window due to limitation of hardware or processing capability. In another embodiment as shown in FIG. 19, by lengthening a length of the CP, one sampling window can sample one period of signal of a UE in the center of the cell and a UE at a 200 km location away of a cell edge as well. However, lengthening the CP generates a problem that, the signal in the sampling window of the UE at 200 km away from the center of the cell and the signal of a 19a segment are the same because the CP part is a cyclic shift of the SEQ part. In this way, how to distinguish a signal sampled by the sampling window and the signal of the 19a segment? If it is the signal of the 19a segment, the signal is considered as the RTD of a UE signal represented by a dotted line. In this way, an estimated RTD may have an error of a SEQ period (800 μs), which may also be hereinafter described as ambiguity of RTD estimation.

Such error may be eliminated through one of the following methods. 1) After estimating out an RTD value through a sampling window, the base station sends the RTD value to the UE, and if a Message 3 reported from the UE is not received later on, an RTD with adjustment of a SEQ period is re-sent. The adjustment of a SEQ period which is performed to the RTD is to add a time length of a SEQ period to the RTD which is less than the SEQ period. 2) Alternatively, after receiving the RTD sent by the base station, the UE establishes an uplink channel through timing of the RTD, and reports Message 3. If the UE finds that no further message from the base station is received, which indicates that the base station fails to receive the Message 3, the Message 3 is sent again after timing of uplink transmission is adjusted by a SEQ period. The adjustment of a SEQ period which is performed to the RTD is to add a time length of a SEQ period to the RTD which is less than the SEQ period.

The two methods can overcome the problem of ambiguity by making two attempts at most through scheduling, and although the two methods will bring a certain delay in the process, the delay is not a great issue.

Figure 20:
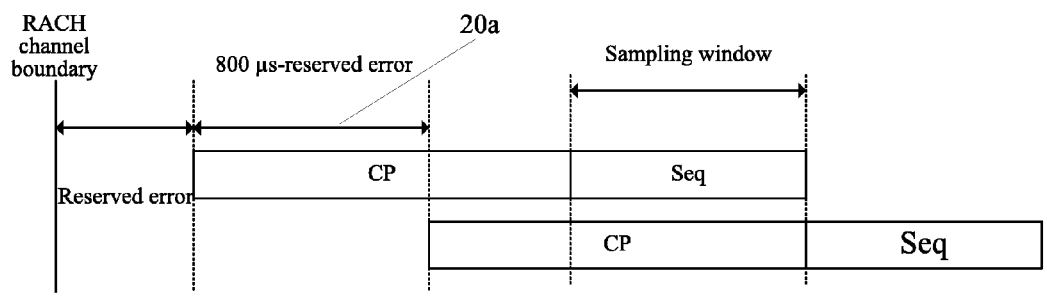
FIG. 20 is a diagram of detection of ambiguity of an estimation error according to an embodiment.

Such ambiguity bias may also be eliminated through the following method. As shown in FIG. 20, the base station samples the signal in another window additionally, the timing of the window is before the original sampling window, and a specific period of the window is 20a in FIG. 20, that is, from an end of reserved timing to (800 μs—reserved timing). The purpose of setting a small segment of reserved timing is to have the window to cover more UE signals as possible, no matter the actual RTD of the UE. Otherwise, energy of a correlation output after correlation processing could not be strong enough. If the energy of the signal can be detected, it is considered that the actual RTD should be less than the SEQ period (800 μs). Otherwise, the actual RTD should be greater than the SEQ period (800 μs). The RTD estimation could be corrected based on this.

Persons of ordinary skill in the art may understand that, the method and the system disclosed in the present invention are merely illustrative, and the processes included in the method are not limited to the order stated herein but can be adjusted according to specific requirements and implementation convenience of the technology. In addition to the foregoing content listed, according to requirements in specific scenes, the method and the system may further include other processes and modules. The technical solution of the present invention may be applied to the LTE, the TD-LTE (Time Division LTE), and other various communication systems, where the other various communication systems are based on random access channels of Zadoff-Chu sequences.

Persons of ordinary skill in the art may realize that, units and algorithm steps which are of each example and are described with reference to the embodiments disclosed in the application can be implemented through electronic hardware, computer software, or a combination of the two. In order to clearly describe the interchangeability between the hardware and the software, compositions and steps of each example are generally described according to functions in the foregoing descriptions. Whether these functions are executed in a manner of hardware or software depends upon the particular application and design constraint conditions of the technical solution. Persons skilled in the art can use different methods to implement the described functions for each particular application, but it should not be considered that the implementation goes beyond the scope of the present invention.

The steps of the methods or algorithms described with reference to the embodiments disclosed in this application may be implemented by using hardware, a software module executed by a processor, or a combination of the two. The software module may be placed in a Random Access Memory (RAM), a memory, a Read-only Memory (ROM), an Electrically Programmable ROM, an Electrically Erasable Programmable ROM, a register, a hard disk, a removable magnetic disk, a CD-ROM, or any storage medium of any other forms well-known in the technical field.

Although some embodiments of the present invention are shown and described, persons skilled in the art should understand that, various modifications may be performed on these embodiments without departing from the principle and the spirit of the present invention, and such modifications should be within the scope of the present invention.

What is claimed is:

1. A method for processing random access in a wireless communication network, the method comprising:
   receiving, by a base station, in a random access channel (RACH) from a user equipment (UE), a first Zadoff-Chu sequence and a second Zadoff-Chu sequence, wherein a $d_u$ of the first Zadoff-Chu sequence is smaller than a $d_u$ of the second Zadoff-Chu; sequence and wherein the UE is in a first moving state for the first Zadoff-Chu sequence and is in the first moving state for the second Zadoff-Chu sequence;
   estimating, by the base station, a range for a round trip delay (RTD) of the UE in accordance with the first Zadoff-Chu sequence;
   estimating, by the base station, at least one of the RTD of the UE and a frequency offset of an uplink signal from the UE to the wireless communication network, each estimation in accordance with the range for the RTD and the second Zadoff-Chu sequence; and
   demodulating a message based at least in part off of the at least one of the RTD of the UE and the frequency offset of the uplink signal from the UE to the wireless communication network.

2. The method according to claim 1, wherein the $d_u$ of the second Zadoff-Chu sequence is greater than K fold of the $d_u$ of the first Zadoff-Chu sequence, wherein a value of the K is an integer determined in accordance with a maximum frequency offset allowed by the wireless communication network and a bandwidth of a subcarrier of the RACH.

3. The method according to claim 1, further comprising informing, by the base station, the UE of information about the first Zadoff-Chu sequence and information about the second Zadoff-Chu sequence through a broadcast channel.

4. The method according to claim 3, wherein the informing the UE of information about the first Zadoff-Chu sequence and information about the second Zadoff-Chu sequence through a broadcast channel comprises informing, by the base station, the UE of one or more Zadoff-Chu sequence pairs through the broadcast channel, wherein one of the one or more Zadoff-Chu sequence pairs comprises the first Zadoff-Chu sequence and the second Zadoff-Chu sequence.

5. The method according to claim 1, further comprising informing, by the base station, the UE of information about a first Zadoff-Chu sequence group and a second Zadoff-Chu sequence group, wherein each group comprises one or more Zadoff-Chu sequences, wherein the first Zadoff-Chu sequence is included in the first Zadoff-Chu sequence group, and the second Zadoff-Chu sequence is included in the second Zadoff-Chu sequence group.

6. The method according to claim 5, wherein a $d_u$ of each sequence of the second Zadoff-Chu sequence group is within a range of $$\left( \frac{839 - 2KN}{2K+1}, \frac{839 + N}{2K+1} \right),$$

wherein N is a number of sequences of the second Zadoff-Chu sequence group and K is a rate of a maximum frequency offset allowed by the wireless communication network to a bandwidth of a subcarrier of the RACH.

7. The method according to claim 1, wherein the estimating the frequency offset of the uplink signal from the UE comprises:
   identifying, by the base station, according to a timing of the range for the RTD, a pattern of one or two peaks of a correlation output Power Delay Profile (PDP) of the second Zadoff-Chu sequence; and
   estimating the frequency offset corresponding to the pattern for the uplink signal received by the wireless communication network from the UE.

8. The method according to claim 7, wherein the identifying the pattern of one or two peaks of the correlation output PDP of the second Zadoff-Chu sequence comprises:
   performing, by the base station, a cyclic left shift to the correlation output PDP of the second Zadoff-Chu sequence by a lower limit of the range for the RTD;
   defining at least one frequency offset window having a peak; and
   identifying the pattern.

9. An apparatus for processing random access in a wireless communication network, comprising:
   a receiver configured to receive in a random access channel (RACH) from a user equipment (UE) a radio frequency signal which comprises a first Zadoff-Chu sequence and a second Zadoff-Chu sequence, wherein a $d_u$ of the first Zadoff-Chu sequence is smaller than a $d_u$ of the second Zadoff-Chu sequence;
   a processor configured to perform frequency domain to time domain baseband processing on the radio frequency signal, also configured to estimate a range for a round trip delay (RTD) of the UE in accordance with the first Zadoff-Chu sequence, and estimate, in accordance with the range for the RTD and the second Zadoff-Chu sequence, at least one of the RTD of the UE and a frequency offset of an uplink signal from the UE to the wireless communication network, and also configured to demodulate a message based at least in part on the at least one of the RTD of the UE and the frequency offset of the uplink signal from the UE to the wireless communication network.

10. The apparatus according to claim 9, wherein the $d_u$ of the second Zadoff-Chu sequence is greater than K fold of the $d_u$ of the first Zadoff-Chu sequence, wherein a value of the K is an integer determined in accordance with a maximum frequency offset allowed by the wireless communication network and a bandwidth of a subcarrier of the RACH.

11. The apparatus according to claim 9, wherein the apparatus informs the UE of information about a first Zadoff-Chu sequence group and a second Zadoff-Chu sequence group, wherein each group comprises one or more Zadoff-Chu sequences, wherein the first Zadoff-Chu sequence is included in the first Zadoff-Chu sequence group, and the second Zadoff-Chu sequence is included in the second Zadoff-Chu sequence group.

12. The apparatus according to claim 11, wherein a $d_u$ of each sequence of the second Zadoff-Chu sequence group is within a range of $$\left(\frac{839-2KN}{2K+1}, \frac{839+N}{2K+1}\right),$$

wherein N is a number of sequences of the second Zadoff-Chu sequence group and K is a rate of a maximum frequency offset allowed by the wireless communication network to a bandwidth of a subcarrier of the RACH.

13. The apparatus according to claim 9, further comprising a broadcast channel module configured to inform the UE of one or more Zadoff-Chu sequence pairs through a broadcast channel, wherein one of the one or more Zadoff-Chu sequence pairs comprises the first Zadoff-Chu sequence and the second Zadoff-Chu sequence.

14. The apparatus according to claim 9, wherein the processor is further configured to identify, according to a timing of the range for the RTD, a pattern of one or two peaks of a correlation output Power Delay Profile (PDP) of the second Zadoff-Chu sequence, and estimate the frequency offset corresponding to the pattern for the uplink the signal received by the wireless communication network from the user equipment.

15. The apparatus according to claim 14, wherein the processor is further configured to perform a cyclic left shift on the correlation output PDP of the second Zadoff-Chu sequence by a lower limit of the range for the RTD, define at least one frequency offset window having a peak, and identify the pattern.

16. A random access method of a user equipment (UE), comprising:
obtaining, by the UE while the UE is in a first moving state, a first Zadoff-Chu sequence and a second Zadoff-Chu sequence, wherein a $d_u$ of the first Zadoff-Chu sequence is smaller than a $d_u$ of the second Zadoff-Chu sequence; and sending, by the UE while the UE is in the first moving state, in a random access channel (RACH) to a base station, the first Zadoff-Chu sequence and the second Zadoff-Chu sequence, wherein the base station estimates a range for a round trip delay (RTD) of the UE based on the first Zadoff-Chu sequence, and the base station estimates a RTD within the range for the RTD or estimates a frequency offset of an uplink signal of the UE based on the second Zadoff-Chu sequence and wherein the base station demodulates a message based on either the estimate of the RTD or the estimate of the frequency offset.

17. The method according to claim 16, wherein the step of obtaining the first Zadoff-Chu sequence and the second Zadoff-Chu sequence comprises:
receiving, by the UE, a base station broadcast channel notification from the base station; and
obtaining the first Zadoff-Chu sequence and the second Zadoff-Chu sequence according to the base station broadcast channel notification.

18. A user equipment (UE), comprising:
a memory configured to store a first Zadoff-Chu sequence and a second Zadoff-Chu sequence, wherein a $d_u$ of the first Zadoff-Chu sequence is smaller than a $d_u$ of the second Zadoff-Chu sequence, wherein the first Zadoff-Chu sequence is used to estimate a range for a round trip delay (RTD), the second Zadoff-Chu sequence is used to identify the RTD within the range for the RTD or identify a frequency offset of an uplink signal of the UE, and wherein either the RTD within the range for the RTD or the frequency offset of the uplink signal of the UE are used to demodulate a message; and
a processor configured to perform time domain to frequency domain baseband signal processing on the first Zadoff-Chu sequence and the second Zadoff-Chu sequence.

19. The UE according to claim 18, further comprising a receiver configured to receive the first Zadoff-Chu sequence and the second Zadoff-Chu sequence which are notified through a base station broadcast channel.

20. The UE according to claim 18, further comprising a Zadoff-Chu sequence generating module configured to generate the first Zadoff-Chu sequence and the second Zadoff-Chu sequence.

* * * * *